United States Patent
Ameling et al.

(10) Patent No.: US 12,244,477 B2
(45) Date of Patent: Mar. 4, 2025

(54) METHODS, SYSTEMS, AND COMPUTER READABLE MEDIA FOR RECYCLING BACKGROUND TRAFFIC IN A TEST ENVIRONMENT

(71) Applicant: Keysight Technologies, Inc., Santa Rosa, CA (US)

(72) Inventors: Thomas Ameling, Woodland Hills, CA (US); Razvan Ionut Stan, Agoura Hills, CA (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 409 days.

(21) Appl. No.: 17/498,723

(22) Filed: Oct. 11, 2021

(65) Prior Publication Data

US 2023/0115762 A1    Apr. 13, 2023

(51) Int. Cl.
*H04L 43/08* (2022.01)
*H04L 45/00* (2022.01)

(52) U.S. Cl.
CPC .............. *H04L 43/08* (2013.01); *H04L 45/20* (2013.01)

(58) Field of Classification Search
CPC ....... H04L 43/08; H04L 45/20; H04L 41/122; H04L 41/145; H04L 41/147; H04L 41/22; H04L 43/20; H04L 43/50
See application file for complete search history.

(56) References Cited

U.S. PATENT DOCUMENTS

| | | |
|---|---|---|
| 4,792,753 A | 12/1988 | Iwai |
| 5,247,517 A | 9/1993 | Ross et al. |
| 5,343,463 A | 8/1994 | Van Tetering et al. |
| 5,390,314 A | 2/1995 | Swanson |
| 5,477,531 A | 12/1995 | McKee et al. |
| 5,535,338 A | 7/1996 | Krause et al. |

(Continued)

FOREIGN PATENT DOCUMENTS

| | | |
|---|---|---|
| CN | 107104903 A | 8/2017 |
| EP | 0895375 A2 | 2/1999 |

(Continued)

OTHER PUBLICATIONS

Non-Final Office Action for U.S. Appl. No. 17/069,768, filed Jan. 27, 2022.

(Continued)

*Primary Examiner* — Benjamin H Elliott, IV
*Assistant Examiner* — Yewon Kim

(57) ABSTRACT

Methods, systems, and computer readable media for recycling background traffic in a test environment are disclosed. One example method occurs at a test system implemented using at least one processor, the method comprising: generating background packets usable as background traffic in a data center switching fabric used in delivering test traffic to a system under test (SUT); sending, from a first packet source of the test system and via the data center switching fabric, the background packets toward a first packet destination of the test system; receiving, by the first packet destination, at least some of the background packets; and resending, from a re-entry packet source of the test system and via the data center switching fabric, at least one received background packet toward the first packet destination or a second packet destination.

20 Claims, 8 Drawing Sheets

(56) References Cited

U.S. PATENT DOCUMENTS

| | | |
|---|---|---|
| 5,568,471 A | 10/1996 | Hershey et al. |
| 5,583,792 A | 12/1996 | Li et al. |
| 5,590,285 A | 12/1996 | Krause et al. |
| 5,600,632 A | 2/1997 | Schulman |
| 5,657,438 A | 8/1997 | Wygodny et al. |
| 5,671,351 A | 9/1997 | Wild et al. |
| 5,761,486 A | 6/1998 | Watanabe et al. |
| 5,787,147 A | 7/1998 | Gundersen |
| 5,787,253 A | 7/1998 | McCreery et al. |
| 5,822,520 A | 10/1998 | Parker |
| 5,838,919 A | 11/1998 | Schwaller et al. |
| 5,850,386 A | 12/1998 | Anderson et al. |
| 5,850,388 A | 12/1998 | Anderson et al. |
| 5,854,889 A | 12/1998 | Liese et al. |
| 5,878,032 A | 3/1999 | Mirek et al. |
| 5,905,713 A | 5/1999 | Anderson et al. |
| 5,974,237 A | 10/1999 | Shurmer et al. |
| 5,974,457 A | 10/1999 | Waclawsky et al. |
| 5,978,940 A | 11/1999 | Newman et al. |
| 5,982,852 A | 11/1999 | Schwartz |
| 6,031,528 A | 2/2000 | Langfahl, Jr. |
| 6,044,091 A | 3/2000 | Kim |
| 6,108,800 A | 8/2000 | Asawa |
| 6,122,670 A | 9/2000 | Bennett et al. |
| 6,148,277 A | 11/2000 | Asava et al. |
| 6,172,989 B1 | 1/2001 | Yanagihara et al. |
| 6,173,333 B1 | 1/2001 | Jolitz et al. |
| 6,189,031 B1 | 2/2001 | Badger et al. |
| 6,233,256 B1 | 5/2001 | Dieterich et al. |
| 6,279,124 B1 | 8/2001 | Brouwer et al. |
| 6,295,557 B1 | 9/2001 | Foss et al. |
| 6,317,788 B1 | 11/2001 | Richardson |
| 6,321,264 B1 | 11/2001 | Fletcher et al. |
| 6,345,302 B1 | 2/2002 | Bennett et al. |
| 6,363,056 B1 | 3/2002 | Beigi et al. |
| 6,430,617 B1 | 8/2002 | Britt et al. |
| 6,446,121 B1 | 9/2002 | Shah et al. |
| 6,507,923 B1 | 1/2003 | Wall et al. |
| 6,526,259 B1 | 2/2003 | Ho |
| 6,545,979 B1 | 4/2003 | Poulin |
| 6,601,020 B1 | 7/2003 | Myers |
| 6,621,805 B1 | 9/2003 | Kondylis et al. |
| 6,678,246 B1 | 1/2004 | Smyth |
| 6,711,137 B1 | 3/2004 | Klassen et al. |
| 6,717,917 B1 | 4/2004 | Weissberger et al. |
| 6,782,503 B1 * | 8/2004 | Dawson .................. H04L 43/50 |
| | | 714/739 |
| 6,826,259 B2 | 11/2004 | Hoffman |
| 6,845,352 B1 | 1/2005 | Wang |
| 6,917,595 B2 | 7/2005 | Chang et al. |
| 7,096,264 B2 | 8/2006 | Bonney et al. |
| 7,099,438 B2 | 8/2006 | Rancu et al. |
| 7,123,616 B2 | 10/2006 | Weissberger et al. |
| 7,143,159 B1 | 11/2006 | Grace et al. |
| 7,222,255 B1 | 5/2007 | Claessens et al. |
| 7,304,951 B2 | 12/2007 | Rhee |
| 7,327,686 B2 | 2/2008 | Standridge |
| 7,342,897 B1 | 3/2008 | Nader et al. |
| 7,366,174 B2 | 4/2008 | MacFaden et al. |
| 7,418,492 B1 | 8/2008 | Cohen et al. |
| 7,486,728 B2 | 2/2009 | Park |
| 7,507,948 B2 | 3/2009 | Park et al. |
| 7,525,473 B2 | 4/2009 | Chu et al. |
| 7,840,664 B2 | 11/2010 | Dugatkin et al. |
| 7,873,056 B2 | 1/2011 | Higuchi et al. |
| 7,908,130 B2 | 3/2011 | Van Ginkel et al. |
| 7,979,225 B2 | 7/2011 | Muller et al. |
| 8,718,070 B2 | 5/2014 | Koponen et al. |
| 8,761,187 B2 | 6/2014 | Barde |
| 8,898,333 B1 | 11/2014 | White et al. |
| 8,914,432 B2 | 12/2014 | Hannel et al. |
| 8,942,109 B2 | 1/2015 | Dorenbosch et al. |
| 8,949,830 B2 | 2/2015 | Kannan et al. |
| 8,959,185 B2 | 2/2015 | Nakil et al. |
| 9,042,245 B2 | 5/2015 | Tzannes et al. |
| 9,049,271 B1 | 6/2015 | Hobbs et al. |
| 9,065,770 B2 | 6/2015 | Chew et al. |
| 9,231,849 B2 | 1/2016 | Youdou et al. |
| 9,294,296 B2 | 3/2016 | Kirschnick et al. |
| 9,503,382 B2 | 11/2016 | DeCusatis et al. |
| 9,544,233 B2 | 1/2017 | Ansari et al. |
| 9,614,689 B2 | 4/2017 | Cook et al. |
| 9,628,339 B1 | 4/2017 | Thai et al. |
| 9,819,551 B2 | 11/2017 | Forster et al. |
| 9,898,317 B2 | 2/2018 | Nakil et al. |
| 9,912,592 B2 | 3/2018 | Sampath et al. |
| 9,971,620 B2 | 5/2018 | Karnes |
| 10,015,072 B2 | 7/2018 | Cantwell et al. |
| 10,063,473 B2 | 8/2018 | Wenig |
| 10,579,408 B2 | 3/2020 | Wang et al. |
| 10,623,296 B2 | 4/2020 | Haramaty et al. |
| 10,649,747 B2 | 5/2020 | Voellmy |
| 10,686,671 B1 | 6/2020 | Mozumdar et al. |
| 10,733,088 B1 | 8/2020 | Sommers |
| 10,742,533 B2 | 8/2020 | Yadav et al. |
| 10,868,730 B2 | 12/2020 | Mozumdar et al. |
| 10,880,019 B1 | 12/2020 | Mestre Adrover et al. |
| 10,880,197 B2 | 12/2020 | Naskar et al. |
| 11,323,354 B1 | 5/2022 | Sommers |
| 11,388,081 B1 | 7/2022 | Sommers et al. |
| 11,405,302 B1 | 8/2022 | Liu et al. |
| 11,483,227 B2 | 10/2022 | Sommers |
| 11,483,228 B2 | 10/2022 | Liu et al. |
| 11,729,087 B2 | 8/2023 | Bergeron et al. |
| 11,765,068 B2 | 9/2023 | Sommers |
| 12,056,028 B2 | 8/2024 | Sommers |
| 2001/0016867 A1 | 8/2001 | Hu et al. |
| 2002/0056100 A1 | 5/2002 | Shimomura et al. |
| 2002/0105911 A1 | 8/2002 | Pruthi et al. |
| 2002/0138226 A1 | 9/2002 | Doane |
| 2002/0162059 A1 | 10/2002 | Mcneely et al. |
| 2002/0172205 A1 | 11/2002 | Tagore-Brage et al. |
| 2002/0184527 A1 | 12/2002 | Chun et al. |
| 2003/0009544 A1 | 1/2003 | Wach |
| 2003/0043434 A1 | 3/2003 | Brachmann et al. |
| 2003/0061506 A1 | 3/2003 | Cooper et al. |
| 2003/0069952 A1 | 4/2003 | Tams et al. |
| 2003/0139919 A1 | 7/2003 | Sher et al. |
| 2003/0188003 A1 | 10/2003 | Sylvest et al. |
| 2003/0191590 A1 | 10/2003 | Narayan et al. |
| 2003/0231741 A1 | 12/2003 | Rancu et al. |
| 2004/0111502 A1 | 6/2004 | Oates |
| 2004/0111519 A1 | 6/2004 | Fu et al. |
| 2004/0117474 A1 | 6/2004 | Ginkel et al. |
| 2004/0236866 A1 | 11/2004 | Dugatkin et al. |
| 2005/0021715 A1 | 1/2005 | Dugatkin et al. |
| 2006/0002305 A1 | 1/2006 | Ginzburg |
| 2008/0186968 A1 | 8/2008 | Farinacci et al. |
| 2010/0008305 A1 | 1/2010 | Yeo et al. |
| 2010/0153055 A1 | 6/2010 | Mucha et al. |
| 2011/0141917 A1 * | 6/2011 | Su .................. H04L 49/555 |
| | | 370/250 |
| 2012/0120801 A1 | 5/2012 | Ramakrishnan et al. |
| 2013/0013107 A1 | 1/2013 | Felique |
| 2013/0063441 A1 | 3/2013 | Choy et al. |
| 2014/0006570 A1 | 1/2014 | Loos et al. |
| 2014/0047125 A1 | 2/2014 | Hyoudou et al. |
| 2014/0160961 A1 | 6/2014 | Dragulescu et al. |
| 2014/0169173 A1 * | 6/2014 | Naouri .................. H04L 49/351 |
| | | 370/237 |
| 2014/0269371 A1 * | 9/2014 | Badea ................. H04L 43/0858 |
| | | 370/252 |
| 2014/0298335 A1 | 10/2014 | Regev et al. |
| 2014/0321285 A1 | 10/2014 | Chew et al. |
| 2015/0317169 A1 | 11/2015 | Sinha et al. |
| 2015/0334030 A1 | 11/2015 | Vasseur et al. |
| 2015/0365288 A1 | 12/2015 | Van Der et al. |
| 2016/0301601 A1 * | 10/2016 | Anand .................... H04L 69/22 |
| 2017/0126588 A1 | 5/2017 | Anand et al. |
| 2017/0353531 A1 | 12/2017 | Conn |
| 2018/0101631 A1 | 4/2018 | Havard |
| 2019/0222481 A1 | 7/2019 | Hira |
| 2019/0372881 A1 | 12/2019 | Hu et al. |
| 2020/0021512 A1 | 1/2020 | Naskar et al. |

(56) References Cited

U.S. PATENT DOCUMENTS

| | | |
|---|---|---|
| 2020/0028772 A1 | 1/2020 | Laslau |
| 2020/0112524 A1 | 4/2020 | Sindhu et al. |
| 2020/0133688 A1 | 4/2020 | Shinde et al. |
| 2020/0195519 A1 | 6/2020 | Di Martino |
| 2020/0280518 A1 | 9/2020 | Lee et al. |
| 2020/0296023 A1 | 9/2020 | Kumar et al. |
| 2020/0313999 A1 | 10/2020 | Lee et al. |
| 2020/0366588 A1 | 11/2020 | Bergeron |
| 2021/0328902 A1 | 10/2021 | Huselton et al. |
| 2022/0116303 A1* | 4/2022 | Sommers ............... H04L 41/12 |
| 2022/0116304 A1 | 4/2022 | Sommers et al. |
| 2022/0247661 A1 | 8/2022 | Liu et al. |
| 2022/0253324 A1 | 8/2022 | Liu et al. |
| 2023/0179506 A1 | 6/2023 | Bergeron et al. |
| 2023/0198883 A1 | 6/2023 | Sommers |

FOREIGN PATENT DOCUMENTS

| | | |
|---|---|---|
| JP | 4620103 B2 | 1/2011 |
| WO | 02056541 A2 | 7/2003 |
| WO | 2021015802 A1 | 1/2021 |

OTHER PUBLICATIONS

Notice of Allowance and Fee(s) Due for U.S. Appl. No. 17/067,627, filed Feb. 8, 2022.

Notice of Allowance and Fee(s) Due for U.S. Appl. No. 17/217,920, filed Jan. 14, 2022.

"INE Network Emulator Appliance," Technical Specifications, pp. 1-2 (2018).

Notice of Allowance for U.S. Appl. No. 17/560,187, filed Jun. 23, 2023.

Corrected Notice of Allowability for U.S. Appl. No. 17/542,011, filed Apr. 4, 2023.

Notice of Allowance and Fee(s) Due for U.S. Appl. No. 17/542,011, filed Mar. 27, 2023.

"TekExpress USB 3.0 (USB-RMT) Automated Receiver Compliance and Margin Test Solutions," Tektronix, pp. 1-154 (2021).

"QSFP DD Loopback Modules," High Speed IO, Amphenol ICC, pp. 1-2 (2021).

Sultana et al., "Flightplan Dataplane Disaggregation and Placement for P4 Programs," 18th {USENIX} Symposium on Networked Systems Design and Implementation, pp. 1-22 (2021).

"Agilent E4219A Atm Network Impairment Emulator," Keysight, pp. 1-5 (2021).

"Spirent Network Emulator," Spirent Communications, pp. 1-11 (Apr. 2021).

"Ethernet Network Emulator," MGA2510 Product Brief, Aukua Systems, pp. 1-2 (2021).

"Chimera Network Impairment Emulator," Xena Networks, pp. 1-2 (2021).

Commonly-Assigned, co-pending U.S. Appl. No. 17/542,011 for "Methods, Systems, and Computer Readable Media for Providing Adaptive Background Test Traffic in a Test Environment." (Unpublished, filed Dec. 3, 2021).

Notice of Allowance and Fee(s) Due for U.S. Appl. No. 17/067,627, filed Oct. 22, 2021.

Advisory Action for U.S. Appl. No. 17/069,768, filed Sep. 28, 2021.

Non-Final Office Action for U.S. Appl. No. 17/198,870, filed Sep. 17, 2021.

Notice of Allowance and Fee(s) Due for U.S. Appl. No. 17/067,627, filed Aug. 20, 2021.

Final Office Action for U.S. Appl. No. 17/069,768, filed Jul. 9, 2021.

Non-Final Office Action for U.S. Appl. No. 17/069,768, filed Feb. 4, 2021.

"Network Emulator II—Ethernet 10GE, 1GE, and 100MbE Ethernet Impairment Emulation," Keysight Technologies, pp. 1-8 (Oct. 22, 2020).

Commonly-Assigned, co-pending U.S. Appl. No. 17/067,627 for "Methods, Systems, and Computer Readable Media for Network Testing Using Switch Emulation," (Unpublished, filed Oct. 9, 2020).

Commonly-Assigned, co-pending U.S. Appl. No. 17/069,768 for "Methods, Systems and Computer Readable Media for Active Queue Management," (Unpublished, filed Oct. 13, 2020).

Cao et al., "TurboNet: Faithfully Emulating Networks with Programmable Switches," IEEE, pp. 1-11 (2020).

"Datasheet—Albedo Net.Storm," Albedo Telecom, pp. 1-2 (Dec. 23, 2015).

"Albedo Net.Storm," NETSTORM.en, pp. 1-4 (2014).

"The Value of Network Impairment Testing in Power Grids," Calnex SNE, pp. 1-2 (2006).

Zhang et al., "HyperV: A High Performance Hypervisor for Virtualization of the Programmable Data Plane," 2017 26th International Conference on Computer Communication and Networks (ICCCN), pp. 1-9 (2017).

Cziva et al., "High-Performance Virtualized SDN Switches for Experimental Network Testbeds," SI:SC16—INDIS, pp. 1-14 (Nov. 8, 2016).

Khalidi, "SONiC: The networking switch software that powers the Microsoft Global Cloud," Blog(/en-us/blog/) Cloud Strategy, pp. 1-10 (Mar. 8, 2017).

Siron, "What is the Hyper-V Virtual Switch and How Does it Work?" Altaro, pp. 1-22 (Sep. 26, 2019).

Han et al., "Virtualization in Programmable Data Plane: A Survey and Open Challenges," IEEE Open Journal of the Communications Society, pp. 1-7 (2020).

"Networking/SAI," Open Compute, pp. 1-6 (Oct. 2020).

Zhou et al., "HyperTester: High-performance Network Testing Driven by Programmable Switches," In The 15th International Conference on emerging Networking Experiments and Technologies (CoNEXT '19), pp. 1-14 (Dec. 9-12, 2019).

Spirent Communications, "Cloud Computing Testing," pp. 1-10 (Apr. 2010).

Byagowi, A., et al., "Bringing the F16 Network into the Lab," OCP Global Summit, pp. 1-16 (Jan. 29, 2021).

Zhang, C., et al., "MPVisor: A Modular Programmable Data Plane Hypervisor," SOSR, pp. 1-2 (Apr. 3-4, 2017).

Tos et al., "Adaptive RTP Rate Control Method," 2011 35th IEEE Annual Computer Software and Applications Conference Workshops, pp. 1-6 (2011).

Mittal et al., "Dynamic Simulation Control with Queue Visualization," Summer Computer Simulation Conference, pp. 1-7 (Jun. 2005).

"Network Emulator 3," Keysight, pp. 1-7 (Sep. 1, 2022).

"tc(8)—Linux manual page," https://man7.org/linux/man-pages/man8/tc.8.html, pp. 1-15 (Aug. 27, 2021).

"Network Emulator II—Ethernet," Keysight, pp. 1-9 (Jun. 25, 2021).

Broom, "VoIP Quality Assessment: Taking Account of the Edge-Device," IEEE Transactions on Audio, Speech, and Language Processing, vol. 14, No. 6, pp. 1-7 (Nov. 2006).

Notice of Allowance and Fee(s) Due for U.S. Appl. No. 17/217,920, filed Mar. 4, 2022.

Non-Final Office Action for U.S. Appl. No. 17/542,011, filed Sep. 30, 2022.

Notice of Allowance and Fee(s) Due for U.S. Appl. No. 17/069,768, filed Aug. 4, 2022.

Notice of Allowance and Fee(s) Due for U.S. Appl. No. 17/162,620, filed Jul. 13, 2022.

Notice of Allowance and Fee(s) Due for U.S. Appl. No. 17/162,620, filed Jun. 23, 2022).

Notice of Allowance and Fee(s) Due for U.S. Appl. No. 17/198,870, filed Mar. 24, 2022.

Fiandrino, et al., "openLEON: An End-to-End Emulation Platform from the Edge Data Center to the Mobile User", Sep. 7, 2019. Computer Communications 148, Elsevier B.V. (Year: 2019).

Benet, et al., "OpenStackEmu—A Cloud TestBed Combining Network Emulation with OpenStack and SDN", 2017, 14th IEEE Annual Consumer Communications & Networking Conference (CCNC), IEEE. (Year: 2017).

Cao, et al., "TurboNet: Faithfully Emulating Networks with Programmable Switches", IEEE. (Year: 2020).

(56) References Cited

OTHER PUBLICATIONS

Non-Final Office Action for U.S. Appl. No. 17/171,716, filed Mar. 14, 2024.
Notice of Allowance for U.S. Appl. No. 17/171,716 (Sep. 29, 2024).

* cited by examiner

METHODS, SYSTEMS, AND COMPUTER READABLE MEDIA FOR RECYCLING BACKGROUND TRAFFIC IN A TEST ENVIRONMENT

TECHNICAL FIELD

The subject matter described herein relates to network testing. More specifically, the subject matter relates to methods, systems, and computer readable media for recycling background traffic in a test environment.

BACKGROUND

Data center environments typically provide high reliability and security and typically include networked resources (e.g., virtual or physical servers connected via network switches) sharable by multiple clients of the data center operator. Large data centers are industrial scale operations using as much electricity as a small town. Various data centers may utilize virtualization. For example, a data center may implement multiple virtual machines (VMs) that communicate via a virtual switch (vSwitch), e.g., virtual servers, using a physical central processing unit (CPU)-based server or node in the data center. In this example, each VM may execute an operating system and other software, where each VM may appear as a physical server to end users.

When testing data center equipment, it is important to make sure that testing mimics real world scenarios and conditions. For example, when testing a data center server or related applications, it may be necessary to mimic or emulate a switching fabric or other resources in the data center and to emulate or approximate various test scenarios or related processing states, e.g., by using test traffic and/or effecting various processing scenarios.

SUMMARY

Methods, systems, and computer readable media for recycling background traffic in a test environment are disclosed. One example method occurs at a test system implemented using at least one processor, the method comprising: generating background packets usable as background traffic in a switching fabric used in delivering test traffic to a system under test (SUT); sending, from a first packet source of the test system and via the switching fabric, the background packets toward a first packet destination of the test system; receiving, by the first packet destination, at least some of the background packets; and resending, from a re-entry packet source of the test system and via the switching fabric, at least one received background packet toward the first packet destination or a second packet destination.

According to one example system, the system includes a test system implemented using at least one processor and a memory. The test system is configured for: generating background packets usable as background traffic in a switching fabric used in delivering test traffic to a SUT; sending, from a first packet source of the test system and via the switching fabric, the background packets toward a first packet destination of the test system; receiving, by the first packet destination, at least some of the background packets; and resending, from a re-entry packet source of the test system and via the switching fabric, at least one received background packet toward the first packet destination or a second packet destination.

The subject matter described herein may be implemented in software in combination with hardware and/or firmware. For example, the subject matter described herein may be implemented in software executed by a processor. In one example implementation, the subject matter described herein may be implemented using a non-transitory computer readable medium having stored therein computer executable instructions that when executed by the processor of a computer control the computer to perform steps. Example computer readable media suitable for implementing the subject matter described herein include non-transitory devices, such as disk memory devices, chip memory devices, programmable logic devices, field-programmable gate arrays, and application specific integrated circuits. In addition, a computer readable medium that implements the subject matter described herein may be located on a single device or computer platform or may be distributed across multiple devices or computer platforms.

As used herein, the term 'node' refers to a physical computer platform including one or more processors, network interfaces, and memory.

As used herein, each of the terms 'function', 'engine', and 'module' refers to hardware, which may also include software and/or firmware, for implementing the feature(s) being described.

BRIEF DESCRIPTION OF THE DRAWINGS

The subject matter described herein will now be explained with reference to the accompanying drawings of which.

DETAILED DESCRIPTION

Figure 1:
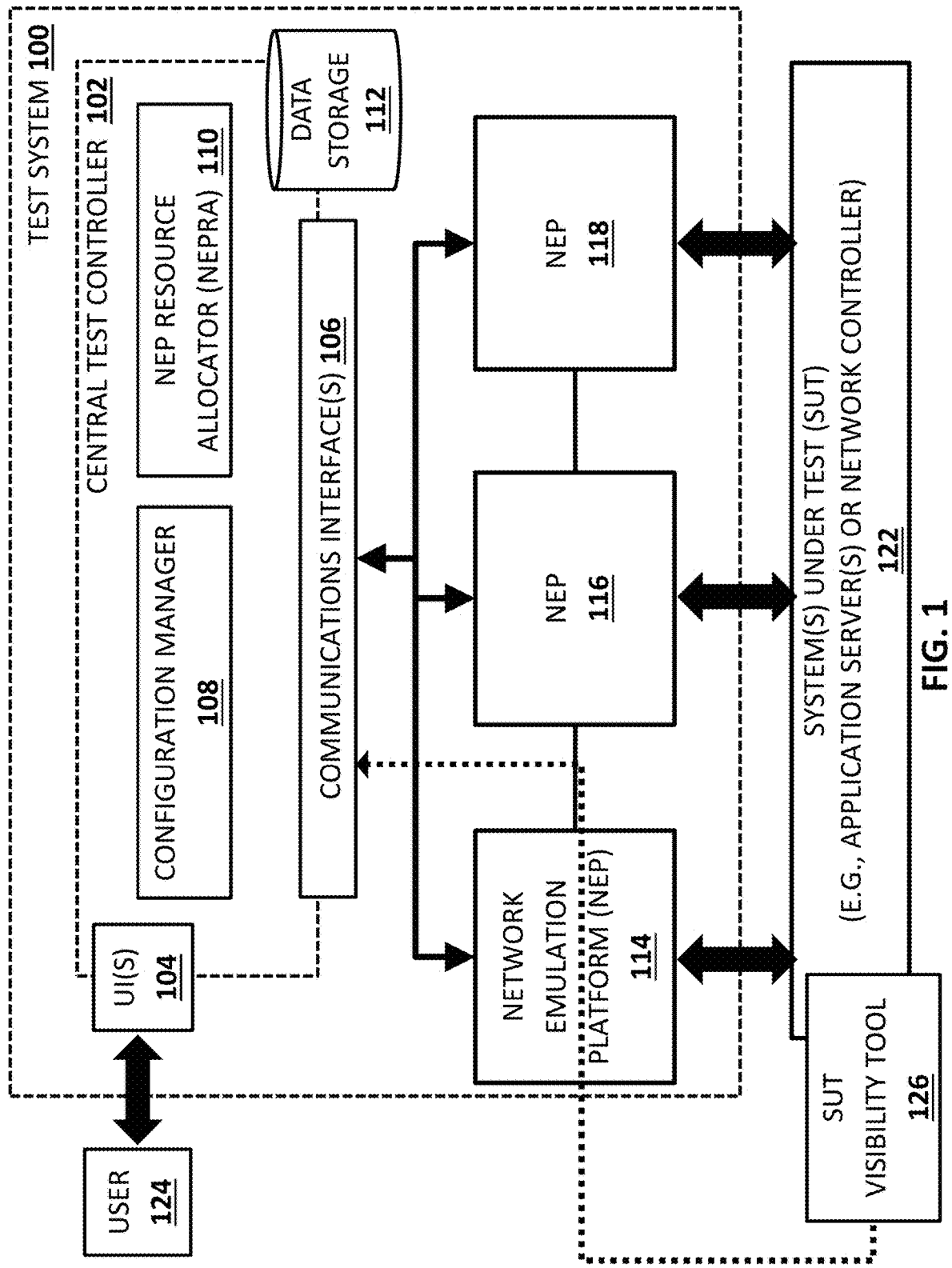
FIG. 1 is a diagram illustrating an example test system for emulating a switching fabric environment.

The subject matter described herein includes methods, systems, and computer readable media for recycling background traffic in a test environment. Various test environments may generate and use test traffic for background traffic or other purposes, e.g., to emulate or approximate realistic network scenarios and/or processing scenarios. As such, a test system that can efficiently generate and (re-)use test traffic can be useful in testing how a network product or service performs at scale in a particular switching fabric environment (e.g., a data center environment) and/or for testing how a network product or service will impact the performance of a particular switching fabric environment or a device associated with that particular switching fabric environment.

In accordance with some aspects of the subject matter described herein, background packets may be generated and recycled in a test environment. For example, an example test system in accordance with some aspects described herein is configured to generate test packet traffic for use in testing various user-specified networking scenarios, to initially inject this test packet traffic into a data center switching fabric such that the test traffic flows through the switching fabric and towards a destination that is accessible via the fabric, and to subsequently recycle some or all of the associated test packets such that a desired level of fabric loading can be obtained and maintained without requiring the test system to constantly generate and inject new test packets. In another example, an example test system in accordance with some aspects described herein may be configured to generate and send, via a switching fabric, background packets (e.g., test related packets that may not be processed by a system under test (SUT) but may be used to represent other traffic traversing a network or a switching fabric during a test session) to a packet destination (e.g., an emulated host with a unique IP address) associated with the test system. In this example, the packet destination or another entity may be configured to recycle or resend at least some of the background packets back through the switching fabric via a same or similar path or via a different path.

In accordance with some aspects of the subject matter described herein, a test system can provide an extensible physical and virtual framework for realistic emulation of data center switching fabrics (e.g., homogenous and heterogenous switching fabric) that can be used to test the performance of various devices, systems, and software (e.g., network interface card (NIC) hardware, server hardware, application software, etc.) in various real-world data center switching fabric environments. In some embodiments, am emulated switching fabric environment may be instrumented with an array of internal sensors that enable the test system to determine or predict the impact of a tested device or service at scale on the performance of a target data center switching fabric.

In accordance with some aspects of the subject matter described herein, an emulated switch is distinctly different from an entity referred to commonly in the industry as a virtual switch. More particularly, a virtual switch (vSwitch) is a software application that runs on top of a CPU, which allows communication between virtual machines, where the virtual machines are administered by a virtual machine hypervisor. A vSwitch does not subdivide and allocate resources of an underlying physical switch (e.g., an application-specific integrated circuit (ASIC) chip) into multiple emulated switches, but instead creates a software representation of a completely virtual switch and there is no mapping to underlying physical switching ASIC hardware.

In accordance with some aspects of the subject matter described herein, a test system (e.g., one or more computing platforms, devices, or nodes) may be configured to emulate a switching fabric environment (e.g., a data center environment), such as virtual networking resources and/or other switching fabric related resources, by using multiple network emulation platforms (NEPs) (e.g., chassis or nodes with one or more physical switching application-specific integrated circuit (ASIC) resources usable for emulating a number of switches connected via various topologies). It will be appreciated that some embodiments include one or more emulated switches, where an emulated switch is a logically allocated portion of a physical switching ASIC of a network emulation platform that appears as an independent logical switch device to the environment (e.g., a DUT, SUT, or controller) by using a NEP resource allocator (NEPRA) and/or a switching ASIC resource allocator (SARA). In some embodiments, the NEPRA and/or SARA is adapted to facilitate collection and reporting of emulated logical switch performance metric information (e.g., emulated logical switch queue depth, emulated logical switch latency, etc.) during a test run or session by a visibility module.

In accordance with some aspects of the subject matter described herein, a test system may be configured to efficiently test network configurations by monitoring and/or analyzing various performance aspects of a SUT associated with an emulated switching fabric environment. For example, an example test system described herein may be configured to emulate a data center environment or switching fabric environment comprising a multi-stage switching network comprising top-of-rack (TOR) switches, switching fabric or pod switches, and spine switches. In this example, the test system may utilize a central test controller that includes a NEPRA and/or a related orchestration layer for assigning multiple NEPs to emulate the data center environment. Using configuration information received via NEPRA or another test system entity, each NEP may utilize a SARA and/or a logical emulation layer to allocate physical switch ports and/or other physical resources to one or more emulated switches. Continuing with this example, the NEPs or entities therein may store related emulation information in one or more data structures for translating communications (e.g., configuration commands or usage report requests) involving virtual and physical resources.

In accordance with some aspects of the subject matter described herein, emulating a switching fabric environment using multiple NEPs (e.g., devices comprising at least one switch usable for emulating switching fabrics) may involve allocating (e.g., statically, semi-statically, or dynamically) to an emulated switch a subset of "front-panel" traffic ports of one or more NEPs for links to a SUT (e.g., servers or hosts that utilize switching fabric services) and for links connecting emulated switches. In some embodiments, external cables may not be required to realize link emulated switches because internal loopback interfaces and related switch pipeline configuration can obviate the need for external cabling within a NEP. In some embodiments, external cables may be used to connect emulated switches because the emulated switches may utilize resources from multiple or different NEPs.

In accordance with some aspects of the subject matter described herein, emulating a switching fabric environment can allow a SUT (e.g., a network management system (NMS), a network operating system (NOS), a software-defined network (SDN) controller, or other entity) to access the emulated switching fabric environment as if it consisted of multiple separate devices, each with their own resources such as traffic ports, buffers/queues, lookup tables, etc. In some embodiments, such emulation can eliminate or reduce the need for the SUT or a testing application to understand the details of the implementation and without requiring the SUT or the testing application to translate emulated switch information to resources of an underlying physical switch and without requiring the SUT or the testing application to monitor control-plane information of each emulated switch by using knowledge of an underlying physical switch's resources.

By recycling test traffic, an example test system can benefit from various advantages including, but not limited to, reducing test packet generation processor resources required to execute test cases that require sustained background test traffic levels and/or loads. Further, an example test system that recycles test packets using various methods or techniques described herein may represent a paradigm shift from the way data center related testing is performed and can provide precise control of the number of packets (e.g., test traffic and/or non-test traffic) in the fabric, e.g., via configuration rules and/or related traffic recycling rules.

It will be appreciated that aspects of the subject matter described herein may be utilized for various test environments including embodiments that involve a data center switching fabric component which is emulated by the test system, as well as embodiments that involve real/physical data center switching fabric elements. It will be appreciated that other embodiments not shown herein may include test scenarios that involve a combination of both emulated and real or physical data center architectures.

Reference will now be made in detail to exemplary embodiments of the subject matter described herein, examples of which are illustrated in the accompanying drawings. Wherever possible, the same reference numbers will be used throughout the drawings to refer to the same or like parts.

FIG. 1 is a diagram illustrating an example test system 100 for network testing. Test system 100 may represent any suitable entity or entities (e.g., one or more computing platforms, nodes, or devices) associated with testing SUT 122 (e.g., one or more application servers, a network controller, or a network management system). For example, test system 100 may include a central test controller (CTC) 102 for allowing a user 124 (e.g., a human operator or another entity) to configure or select a testing scenario (e.g., using predefined and/or user-defined templates), for generating and sending test traffic to SUT 122, for receiving response traffic from SUT 122, for recycling or reusing test traffic of the test environment during testing, and/or for analyzing one or more test results and performance aspects associated with SUT 122.

In some embodiments, test system 100 may include test configuration software, one or more network equipment test devices or platforms, network emulation platforms (NEPs), visibility tools or modules (e.g., physical or virtual network taps), and/or test related software executing on one or more processor(s). In some embodiments, test system 100 may include one or more modules for performing various test related functions. For example, test system 100 may include a traffic (e.g., packet) generator for generating test traffic and/or testing related applications (e.g., a test analyzer or test configuration manager) for testing SUT 122, and a central test controller for triggering and/or managing one or more test sessions associated with one or more NEPs 114-118 or a related emulated environment.

In some embodiments, test system 100 or aspects thereof may be controlled or defined using one or more user-definable data models. For example, test system 100 may allow user 124 to configure or modify a resource allocator model, a switching model, a data center emulation or switching topology model, a traffic generator model, a network visibility model, etc. In this example, high-level or user-definable data models may be converted into lower-level data models or into computer readable instructions for implementing an emulated switching fabric environment using the user-definable data models and resources in one or more of NEPs 114-118.

SUT 122 may be any suitable entity or entities (e.g., devices, systems, or platforms) for receiving, processing, forwarding, and/or sending one or more messages (e.g., packets). In some embodiments, SUT 122 may include one or more logical or physical partition. For example, SUT 122 may include a network node, a network switch, a network router, a network interface card, a packet forwarding device, or one or more virtual network functions (VNF). In this example, SUT 122 or a VNF thereof may be software in a virtual container (VC) or machine (VM) executing on shared resources (e.g., compute, storage, and network resources in a cloud computing environment). In some embodiments, nodes or a VNF of SUT 122 may include processing logic (e.g., rules associated with packet forwarding/processing) that is independent or separate from another portion of SUT 122 or another VNF.

SUT visibility tool 126 may be any suitable entity or entities (e.g., software executing on a processor, an ASIC, an FPGA, or a combination of software, an ASIC, or an FPGA) for monitoring, obtaining, and/or providing SUT performance or related visibility information (e.g., using virtual or physical probes or network taps). For example, SUT visibility tool 126 may include an application programming interface (API) based server or interface that provides collected SUT performance metrics or other related information to test system 100 or entities therein. In this example, SUT visibility tool 126 may obtain various SUT performance related data from one or more visibility related devices, applications, or nodes within or around SUT 122. Continuing with this example, SUT visibility tool 126 may generate performance reports or test analysis reports associated with SUT 122 and may send the reports to test system 100 or entities therein for analysis or other purposes.

Test system 100 may include CTC 102 and multiple NEPs, e.g., NEPs 114-118. CTC 102 may be any suitable entity or entities (e.g., software executing on a processor, a field-programmable gateway array (FPGA), and/or an ASIC, or a combination of software, an FPGA, and/or an ASIC) for performing one or more aspects associated with configuring a test environment or a related testing scenario. In some embodiments, CTC 102 may be implemented using one or more processors and/or memory and may be a single device or node or may be distributed across multiple devices or nodes, e.g., cloud-based. For example, CTC 102 may act as a centralized, cloud-based entity for receiving user input related to setting up a testing scenario involving an emulated switching fabric environment via one or more UI(s) 104 and may use the user input for configuring NEPs 114-118 or other test system entities for the testing scenario. In this example, CTC 102 may send sets of configuration instructions to various modules or entities, e.g., one or more NEPs 114-118 for setting up or configuring an emulated switching fabric environment.

In some embodiments, CTC 102 may include a configuration manager (CM) 108. CM 108 may be any suitable entity or entities (e.g., software executing on a processor, an FPGA, and/or an ASIC, or a combination of software, an FPGA, and/or an ASIC) for performing one or more aspects associated with interfacing with user 124 and/or providing access to various test related services. In some embodiments, CM 108 may include an application programming interface (API) server or gateway and may be usable for providing one or more of UI(s) 104. For example, UI(s) 104 can be usable for provisioning test system 100, controlling test execution, and accessing or viewing test result information including emulated switching fabric environment performance information. In this example, user 124 may communicate with an API server or other test system entity via an external API that is implemented using a remote procedure call (RPC) protocol.

In some embodiments, CM 108 (or a related API server or gateway) may provide access to several test related services (e.g., traffic generation, visibility and switching fabric emulation, chassis resource, test session generation) with which the user can interact, provision, or control. For example, via one or more APIs or UI(s) 104 associated with CM 108, user 124 can provide test traffic generation requirements for a test session; provide or request test result performance metrics; provide data center or switching fabric emulation requirements or configurations; provide which of NEPs 114-118 or related resources are available for use in a test session; and/or provide test session definitions and associated configuration parameters.

In some embodiments, CTC 102, CM 108, and/or related entities may include or utilize one or more UI(s) 104 for receiving settings and/or configuration information for setting up a testing scenario or a related test session. For example, UI(s) 104 may include any interface usable by one or more types of user 124 (e.g., a human or another entity like an application, a machine, or a device) to interact with test system 100 or related entities. In some embodiments, one or more of UI(s) 104 may support automation e.g., via one or more programming languages (e.g., python), a representation state transfer (REST) API, a remote procedure call API (e.g., gRPC API), a command line interface (CLI), a machine-to-machine (M2M) automation interface, and/or a web based GUI.

In some embodiments, UI(s) 104 may include or utilize a GUI or other user interface for selecting and/or configuring emulated switching fabric environments and/or other related settings (e.g., test reporting and/or network visibility settings). For example, CTC 102 and/or CM 108 may provide a web based GUI for obtaining a test operator or another entity's intent for setting up or configuring testing scenarios and/or related emulated switching fabric environments. In this example, the web based GUI may be usable for visually defining a data center switching topology comprising one or more emulated switches and/or to indicate particular physical resources to allocate to each emulated switch. In another example, the web based GUI may be usable for gathering test session settings and/or for providing cabling instructions for interconnecting NEPs 114-118 or other entities associated with a test session or test system 100.

In some embodiments, CTC 102 may include or utilize software (e.g., a distributed control and orchestration layer or related API) that provides one or more interfaces for communicating with various test system entities (e.g., emulated and physical switches) for providing recycling rules and/or related forwarding and/or routing rules of an emulated switching fabric environment and for configuring visibility tools (e.g., SUT visibility tool 126 and/or NEP visibility modules) for obtaining performance related metrics during a test session. In such embodiments, CTC 102 may use gathered performance metrics for various purposes, such as determining whether to (re)adjust recycling rules so as to increase or decrease traffic loads.

In some embodiments, CTC 102 or related entities may include or interact with one or more visibility modules (e.g., SUT visibility tool 126 and/or NEP visibility modules) for obtaining and processing performance metrics or related information (e.g., external or internal event data). In some embodiments, obtained performance metrics or related information may be used in dynamically adjusting an amount of test traffic (e.g., background packets) in a switching fabric or a particular fabric entity and/or adjusting or maintaining a queue depth (e.g., an egress packet queue) at one or more fabric entities (e.g., an emulated or real network switch).

In some embodiments, CM 108 may communicate or interact with a NEP resource allocator (NEPRA) 110. NEPRA 110 may be any suitable entity or entities (e.g., software executing on a processor, an FPGA, an ASIC, or a combination of software, an FPGA, and/or an ASIC) for performing one or more aspects associated with communicating with and/or controlling NEPs or related resources. For example, NEPRA 110 may include or utilize software (e.g., a distributed control and orchestration layer or related API) that provides an interface for communicating with NEPs 114-118 or other test system entities and may be effectively hidden from user 124.

In some embodiments, NEPRA 110 may allocate and manage resources of NEPs 114-118 for emulated switches without requiring a custom ASIC or hardware pipeline. In some embodiments, NEPRA 110 can be external or internal to CM 108.

In some embodiments, NEPRA 110 may include a resource allocator function configured for accessing user-specified switching fabrication emulation requirements or specification information and NEP resource information (e.g., user input and/or predefined knowledge) and to effectively translate the user's declared data center switching fabric emulation specification into a mapping of NEP resources and associated physical resource allocations, e.g., ASIC switch resources in one or more of NEPs 114-118).

For example, after user 124 specifies a switching fabric environment to be emulated (e.g., based on a library of pre-defined switching fabric environments) and specifies that only NEPs 114 and 116 are available for use in emulating the target data center topology, NEPRA 110 (or a related resource allocator function) may access a NEP resource information database and generate a physical switch resource allocation map that is applied to the switches (e.g., ASICs, SoCs, etc.) contained in NEPs 114 and 116. In this example, the generated physical switch resource allocation map may effectively enable the switch resources in NEPs 114 and 116 to emulate the user-specified target data center topology.

Continuing with the above example, if user 124 subsequently selects NEP 118 to be added to the emulated switching fabric environment, NEPRA 110 or a related entity (e.g., a resource allocator function) may generate a new or updated physical switch resource allocation map that is applied to the switches contained in NEPs 114-118, where the updated physical switch resource allocation map may effectively enable the switch resources in NEPs 114-118 to emulate the user-specified target data center topology.

In some embodiments, NEPRA 110 may include a logical to physical adaptor usable for converting and/or translating communications to refer to virtual or physical resources depending on the destination. For example, when requesting information about available switching resources via NEPRA 110, external applications, user 124, and/or SUT 122 may "see" a set of emulated switches each with a subset of resources instead of physical switches in one of NEPs 114-118. In this example, e.g., for NEP 114, logical to physical adaptor 212 may translate information about logical resources into information physical resources of a switch (e.g., a Tomahawk 3 series switch) and vice versa so that interacting nodes may remain unaware of the underlying switch(es) or related switch resources. Continuing with this example, e.g., for NEP 116, logical to physical adaptor 212 may translate information about logical resources into information physical resources of a different type of switch (e.g., a Tomahawk 4 series switch) and vice versa so that interacting nodes may remain unaware of the underlying switch(es) or related switch resources.

In some embodiments, NEPRA 110 may act as an orchestrator and reside between a device interface and interacting entities, e.g., SUT 122, testing applications in NEPs 114-118, or external devices. In such embodiments, NEPRA 110 may act as a communications proxy or agent using a logical interface and an intermediate protocol or API. For example, after a test session is completed, NEPRA 110 may receive a user-specified request for requesting emulated switch performance metrics and, in response, may process or translate the request using a relevant generated physical switch resource map to query or poll the appropriate switch resources (e.g., in NEPs 114-118) in order to obtain and/or synthesize the relevant emulated switching fabric performance information. In this example, the emulated switching fabric performance information may be accessible to user 124 via one or more APIs or UI(s) 104.

In some embodiments, emulated switch performance data associated with various switching levels or stages and types of generated test traffic may be queried or polled (e.g., on-demand, at prescribed intervals, periodically during test execution, etc.) and stored by test system 100 or entities therein. In such embodiments, the emulated switch performance data may be accessible to user 124 via one or more APIs or UI(s) 104.

In some embodiments, test system 100 or entities thereof (e.g., CTC 102 and/or NEPRA 110) may utilize communications interface(s) 106 for interacting with various entities. Communications interface(s) 106 may include or utilize any suitable entity or entities (e.g., one or more network interface cards (NICs), pluggable jacks, physical processors, transceiver modules, direct-attach cables (DACs) and/or other hardware) for sending or receiving communications. For example, communications interface(s) 106 (e.g., physical or virtual links) may allow CTC 102 or other entities (e.g., CM 108 or NEPRA 110) to send configuration information, settings, instructions, or other data to one or more of NEPs 114-118. In another example, communications interface(s) 106 (e.g., via physical or virtual links) may allow CTC 102 or other entities to receive test results or feedback from SUT visibility tool 126, NEP visibility tools, or other entities.

Each of NEPs 114-118 may include hardware and software usable for network emulation and/or switching fabric emulation. For example, each of NEPs 114-118 may be a distinct or separate chassis comprising an implementation of a particular switch processor (e.g., a switching ASIC, a system on a chip (SoC), custom hardware, an FPGA, a software switch, etc.), and dedicated data and control plane test traffic generation hardware resources (e.g., an FPGA, a CPU, a programmable data plane device like a P4 device, etc.). In some embodiments, NEPs 114-118 may be interconnected via various communication ports or links, e.g., 10 gigabit (10G) links, 25 gigabit (25G) links, 40 gigabit (40G) links, 100 gigabit (100G) links, etc.

In some embodiments, test system 100 or entities thereof (e.g., CTC 102, testing applications, and/or NEPRA 110) may include functionality for accessing data storage 112. Data storage 112 may be any suitable entity or entities (e.g., a storage device, a non-transitory computer readable medium, or a storage system) for maintaining or storing information related to data center emulation, network testing, or related test analysis. For example, data storage 112 may include data center emulation data (e.g., NEP resources to emulated switches, physical to logical port mapping, physical buffers to virtual buffers mapping, etc.) and related policies (e.g., virtual and real port speed, virtual and real throughput, topologies, forwarding rules, classes of service, etc.) for sharing physical switch resources amongst the emulated switches. Data storage 112 may also include test traffic models, test sessions, test session data, topology information for emulated switching fabric environments and/or for SUT 122, and/or other information usable for generating performance metrics (e.g., statistics) associated with one or more aspects of SUT 122. In some embodiments, data storage 112 may be located at test system 100, another node, or distributed across multiple platforms or devices.

It will be appreciated that FIG. 1 is for illustrative purposes and that various depicted entities, their locations, and/or their functions described above in relation to FIG. 1 may be changed, altered, added, or removed. For example, a device (e.g., a computer including at least one processor coupled to a memory) may include functionality of CTC 102, CM 108, and NEPRA 110.

Figure 2:
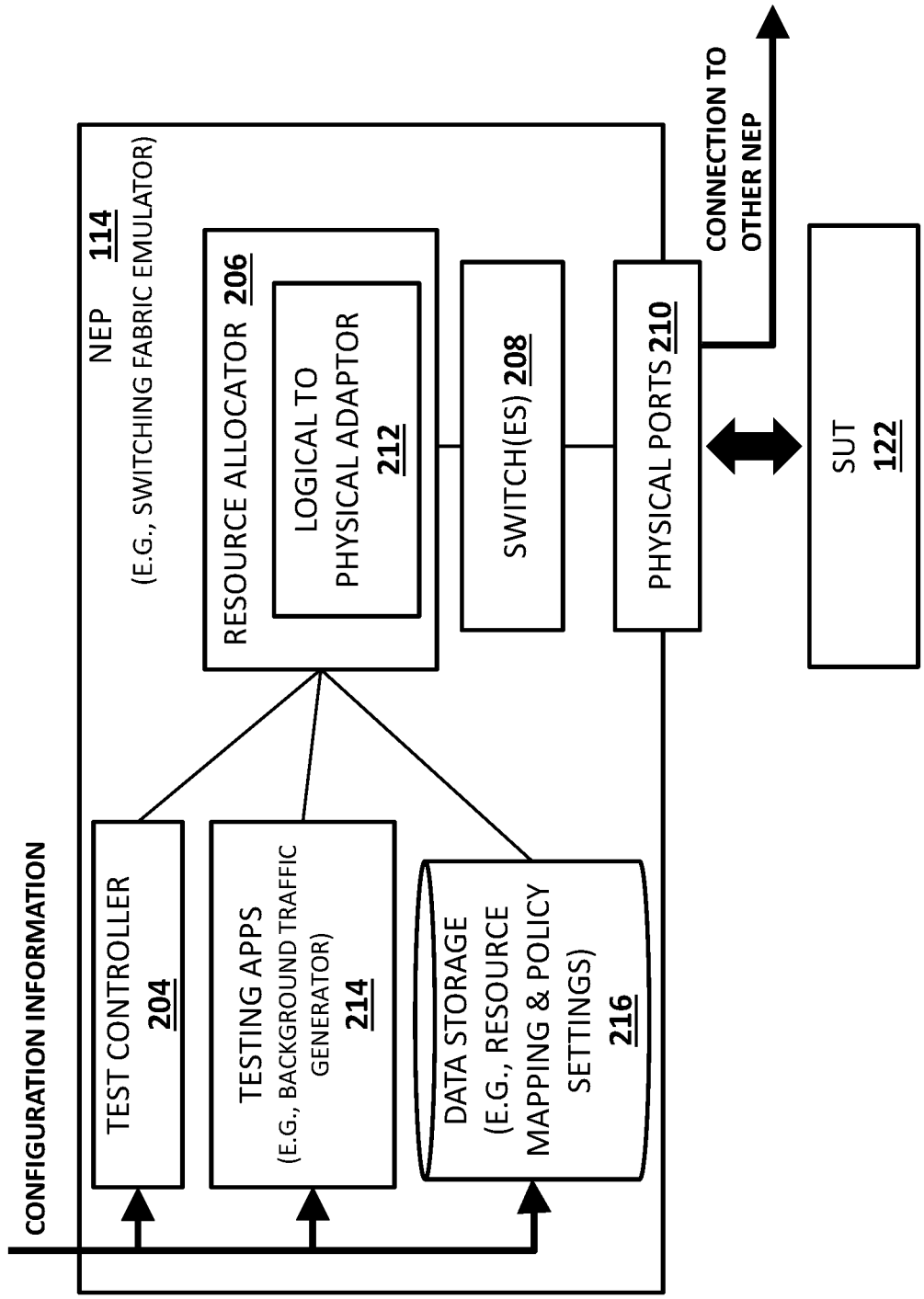
FIG. 2 is a diagram illustrating an example network emulation platform.

FIG. 2 is a diagram illustrating NEP 114. In some embodiments, NEP 114 may include a stand-alone tool, a testing device, a network equipment test device or platform, or software executing on one or more processor(s). In some embodiments, NEP 114 may be a single device or node (e.g., a chassis) and may include one or more modules for emulating a data center or a switching fabric environment and/or may include one or more modules for performing various test related functions associated with the emulated switching fabric environment.

In some embodiments, NEP 114 may be configured to interact with and/or to be configured by CTC 102 or related entities (e.g., CM 108 and/or NEPRA 110). For example, NEP 114, along with other NEPs, may receive particular configuration information from CTC 102 or a related entity via an internal test API. In this example, the configuration information received by NEP 114 may include configuration instructions for configuring NEP 114 or resources therein for use in a testing scenario, e.g., involving one or more test sessions. In another example, the configuration information received by NEP 114 may include test related emulation requirements that are used by NEP 114 or entities therein in generating corresponding or compliant commands or instructions for configuring NEP 114 or resources therein.

NEP 114 may include a test controller (TC) 204, resource allocator (RA) 206, switch(es) 208, ports 210, testing applications 214, and data storage 216. TC 204 may be any suitable entity or entities (e.g., software executing on a processor, an FPGA, and/or an ASIC, or a combination of software, an FPGA, and/or an ASIC) for performing one or more aspects associated with configuring resources in NEP 114 and/or for testing SUT 122. In some embodiments, TC 204 may be implemented using one or more processors and/or memory. For example, TC 204 may utilize one or more processors (e.g., executing software stored in memory) to generate traffic patterns or scenarios for various message streams (e.g., flows or sessions). In another example, TC 204 may also utilize one or more processors to perform or initiate various tests and/or analyses involving test packets and/or related responses from SUT 122. In this example, TC 204 may send instructions to various modules or entities in NEP 114, e.g., testing applications 214 for controlling (e.g., to pause, (re)start, or stop) a test session.

In some embodiments, TC 204 may utilize out-of-band and/or in-band ports and/or interfaces for communicating with entities of NEP 114 or test system 100, e.g., CTC 102. For example, in embodiments where TC 204 is external to RA 206, TC 204 may communicate with RA 206 via a management port or related interface.

In some embodiments, TC 204 may interact with one or more testing applications 214. Testing applications 214 may represent software for testing SUT 122 and/or for performing various test related functions, e.g., performance monitoring, generating and/or recycling test traffic, and test analysis. In some embodiments, testing applications 214 can include, but are not limited to, visibility applications, traffic generators, SDN controller applications, GUI and CLI applications, and test traffic generation applications for communicating with SUT 122 and/or an emulated switching fabric environment implemented using switch(es) 208.

In some embodiments, NEP 114 or aspects thereof may be controlled or defined using one or more user-definable data models. For example, CTC 102 may provide a GUI for allowing user 124 to configure or modify a SARA model, a switching model, a switching fabric topology model, a traffic generator model, a network visibility model, etc. used in a testing scenario or a related emulated switching fabric environment. In this example, CTC 102 may send, to TC 204, high-level or user-definable data models indicating a switching fabric topology comprising one or more emulated switches and/or may indicate particular physical resources to allocate to each emulated switch. Continuing with this example, TC 204 or RA 206 may convert these data models into lower-level data models or related computer readable instructions for implementing an emulated switching fabric environment in accordance with the user-definable data models.

In some embodiments, testing applications 214 may include or utilize settings and/or configuration information from CTC 102 or another source for setting up a data center related testing scenario or a related test session. For example, received settings and/or configuration information may be usable for generating and sending test traffic (e.g., background traffic) that is different from or similar to traffic sent by SUT 122 during a test session. In another example, received settings and/or configuration information may be usable for instructing visibility infrastructure components for monitoring traffic and/or performance aspects associated with a testing scenario or a related emulated switching fabric environment.

In some embodiments, testing applications 214 may include or utilize a traffic generator. For example, a traffic generator may be any suitable entity or entities (e.g., software executing on a processor (e.g., central processing unit (CPU)), an ASIC, an FPGA, or a combination of software, an ASIC, or an FPGA) for performing one or more aspects associated with generating or synthesizing test sessions, test sessions, or related test packets. In this example, the traffic generator may be configured to utilize user input and predefined test session templates or related data to generate one or more test sessions and/or test sessions.

In some embodiments, a traffic generator may generate test traffic that is directed to traverse emulated logical switches or an emulated switching fabric environment. The emulated switching fabric environment may be configured so as to emulate a particular switching fabric or topology. In some embodiments, a traffic generator may include one or more test traffic receivers (e.g., test receive ports) that are configured to receive the test traffic and generate test metric information, which may be accessible to a visibility module of test system 100.

In some embodiments, test traffic may transit the emulated switching fabric environment without being received or transiting SUT 122. For example, user 124 may specify, via CM 108, levels and types of background traffic that can be generated on some or all of the NEPs associated with a particular testing scenario or session. For example, some or all of this test traffic can be configured to transit the emulated switching fabric environment (but not SUT 122) during the execution of a test session involving SUT 122. In another example, some or all of this test traffic can be configured to transit SUT 122 during execution of a test session.

In some embodiments, testing applications 214 may include or utilize a visibility module and/or a related analyzer. In such embodiments, the visibility module and/or the related analyzer may be configurable by TC 204 for monitoring performance or telemetry information in a particular emulated switching fabric environment or topology. For example, a visibility module may be any suitable entity or entities (e.g., software executing on a processor, an ASIC, an FPGA, or a combination of software, an ASIC, or an FPGA) for maintaining network visibility (e.g., using virtual or physical probes or network taps). In this example, virtual taps or software may be configured to provide switch metrics or other information (e.g., network telemetry, switch and/or link status information, etc.) associated with one or more elements (e.g., emulated switches) of an emulated switching fabric environment. Continuing with this example, the visibility module may generate performance reports or test analysis reports associated with SUT 122, e.g., by utilizing the switch metrics or other information associated with packets that pass through or are generated by SUT 122.

In some embodiments, a visibility module may be configured for obtaining emulated logical switch performance metric information associated with a test session by polling RA 206 or another test system entity. For example, by polling for logical switch performance metric information associated with a test session, user 124 may observe how the operation of SUT 122 impacts the emulated switching fabric environment during a test. Polling logical switch performance metric information associated with a test session may also be used for observing how conditions (e.g., background traffic levels) in the emulated switching fabric environment impact the DUT/SUT during a test.

In some embodiments, a visibility module is adapted to obtain or generate telemetry or operational performance data associated with the emulated switches during the execution of a test session involving SUT 122. In such embodiments, the visibility module may correlate the telemetry or operational performance data with SUT endpoint operational activities and events (e.g., SUT operational actions as defined in a test session) and may report performance data and/or correlated SUT endpoint information to user 124.

Switch(es) 208 may represent one or more switch processors (e.g., a switching ASIC, a system on a chip (SoC), custom hardware, an FPGA, a software switch, etc.) and may include additional hardware, firmware, and/or software for performing one or more functions associated with network switching. For example, switch(es) 208 may utilize an ASIC pipeline for performing frame or packet forwarding, e.g., sending a packet received from one port out another port of the switch. In some embodiments, various resources (e.g., lookup tables or match-action tables used for forwarding decisions, traffic manager buffer memory, traffic manager logical queues, etc.) of switch(es) 208 may be managed and/or allocated to provide emulated switches by RA 206.

Ports 210 may include or utilize any suitable entity or entities (e.g., one or more network interface cards (NICs), pluggable jacks, physical processors, transceiver modules, direct-attach cables (DACs) and/or other hardware) for sending or receiving communications. For example, TC 204 or RA 206 may configure one or more of ports 210 (e.g., physical connections) for receiving and sending various types of test packets or related data units; such as IP messages, Ethernet messages, packet data units (PDUs), datagrams, user datagram protocol (UDP) messages, TCP messages, IP version 4 (v4) messages, IP version 6 (v6) messages, stream control transmission protocol (SCTP) messages, real-time transport protocol (RTP) messages, or reliable data protocol (RDP) messages, messages using a tunneling protocol, and/or other data units.

In some embodiments, ports 210 may include user traffic ports and management ports. For example, user traffic ports may be associated with processing, sending, and/or receiving test traffic, non-test traffic, and/or in-band management related communications and management ports may be associated with processing, sending, and/or receiving out-of-band management related communications.

In some embodiments, ports 210 may include multiple port modules or groups of ports for interacting with SUT 122. For example, depending on a test operator's configuration settings or a particular test session setup, RA 206 may allocate a portion of physical resources to each switch that is emulated, where the emulated switches are collectively used to mimic a data center switching fabric. In some embodiments, each emulated switch may be allocated or associated with one or more of ports 210 and the port association may be static or semi-static (e.g., particular ports may be assigned to an emulated switch for a given test session).

RA 206 may be any suitable entity or entities (e.g., software executing on a processor, an FPGA, an ASIC, or a combination of software, an FPGA, and/or an ASIC) for performing one or more aspects associated with allocating resources to emulated switches and/or managing emulated switches. In some embodiments, RA 206 may allocate and manage resources of switch(es) 208 for providing emulated switches without requiring a custom ASIC pipeline. In some embodiments, RA 206 can be external or internal to switch(es) 208.

In some embodiments, RA 206 may utilize one or more management ports or related interfaces for communicating with a controller or related applications (e.g., CTC 102, TC 204 and/or testing applications 214) and/or for communicating with switch(es) 208. For example, TC 204 or a related application may communicate with RA 206 via an out-of-band management port or related interface. In this example, RA 206 may send instructions or other communications to switch(es) 208 via another management port or related interface.

In some embodiments, RA 206 may include a logical to physical adaptor 212. Logical to physical adaptor 212 may be any suitable entity or entities (e.g., software executing on a processor, an FPGA, an ASIC, or a combination of software, an FPGA, and/or an ASIC) for converting and/or translating communications to refer to logical (e.g., virtual) or physical resources depending on the destination. For example, when requesting information about available switching resources via RA 206, testing applications 214 and/or SUT 122 may "see" a set of emulated switches each with a subset of resources instead of switch(es) 208. In this example, logical to physical adaptor 212 may translate information about logical resources into information about physical resources of a single switch (e.g., Tomahawk 3) and vice versa so that interacting nodes may remain unaware of the underlying switch(es) 208 or related switch resources.

In some embodiments, RA 206 and/or logical to physical adaptor 212 may reside between a native device interface and interacting entities (e.g., SUT 122, testing applications 214, or external devices) and may act as a communications proxy or agent using a logical interface. For example, SUT 122 may include a network switch controller that configures switching resources by sending, via a logical interface associated with RA 206, configuration requests for requesting and/or configuring one or more switches. In this example, RA 206 and/or logical to physical adaptor 212 may translate the configuration requests received via the logical interface into one or more corresponding requests for transmission via a native switch interface, where the corresponding requests include commands for configuring appropriate physical resources of underlying switch(es) 208. Further, RA 206 and/or logical to physical adaptor 212 may translate switch performance results coming from a native switch interface into virtualized results (e.g., link status or counter values for a physical port '60' may be changed to values for a logical port 'v1' on an emulated switch TORSW1) before sending the virtualized results to the network switch controller via the logical interface.

In some embodiments, RA 206 and/or logical to physical adaptor 212 may create, store, and/or use switching ASIC emulation data (e.g., physical to logical port mapping, physical buffers to virtual buffers mapping and resource allocation, etc.) and related policies (e.g., virtual and real port speed, virtual and real throughput, topologies, forwarding rules, classes of service, etc.) for sharing physical switch resources amongst the emulated switches. For example, by using port mapping data and policies stored in data storage 216, logical ports 'v1', 'v2', 'v3' on an emulated switch 'TORSW1' may be translated into physical ports '60', '61', '62', respectively. In this example, configuration commands for setting speed of port 'v1' can be translated so that the speed of corresponding physical port '60' is set. Continuing with this example, to query the statistical counters for logical port 'v1', the statistical counters for physical port '60' may be queried.

In some embodiments, RA 206 and/or logical to physical adaptor 212 may utilize a modified proprietary (e.g., vendor) API (e.g., a vendor's software development kit (SDK) or by utilizing a wrapper API that interacts with a vendor API. For example, by using a wrapper API, RA 206 can manage a fleet of emulated switches using off-the-shelf or commodity ASICs with NOSes that utilize a proprietary or vendor API.

In some embodiments, RA 206 and/or logical to physical adaptor 212 may utilize a custom adaptor that handles certain applications or functions which may involve a subset of resource management and mapping requirements than a standard switching API. For example, by using a custom adaptor, RA 206 can manage a fleet of emulated switches for certain use cases using off-the-shelf or commodity ASICs.

In some embodiments, NEP 114 or entities thereof (e.g., TC 204, testing applications 214, and/or RA 206) may include functionality for accessing data storage 216. Data storage 216 may be any suitable entity or entities (e.g., a storage device, a non-transitory computer readable medium, or a storage system) for maintaining or storing information related to switching ASIC emulation, network testing, or related test analysis. For example, data storage 216 may include switching ASIC emulation data (e.g., physical to logical port mapping, physical buffers to virtual buffers mapping, etc.) and related policies (e.g., virtual and real port speed, virtual and real throughput, topologies, forwarding rules, classes of service, etc.) for sharing physical switch resources amongst the emulated switches. Data storage 216 may also include test traffic models, test sessions, test session data, topology information for emulated switching fabric environments, information usable for generating performance metrics (e.g., statistics) associated with one or more aspects of SUT 122, and/or other information associated with testing SUT 122. In some embodiments, data storage 216 may be located at NEP 114, another node, or distributed across multiple platforms or devices.

It will be appreciated that FIG. 2 is for illustrative purposes and that various depicted entities, their locations, and/or their functions described above in relation to FIG. 2 may be changed, altered, added, or removed. For example, NEP 114 may include a chassis or rack including one or more computers (e.g., blade computers) each including at least one processor coupled to a memory, e.g., data storage 216. In this example, each server may include functionality of TC 204, RA 206, and/or testing applications 214.

Figure 3:
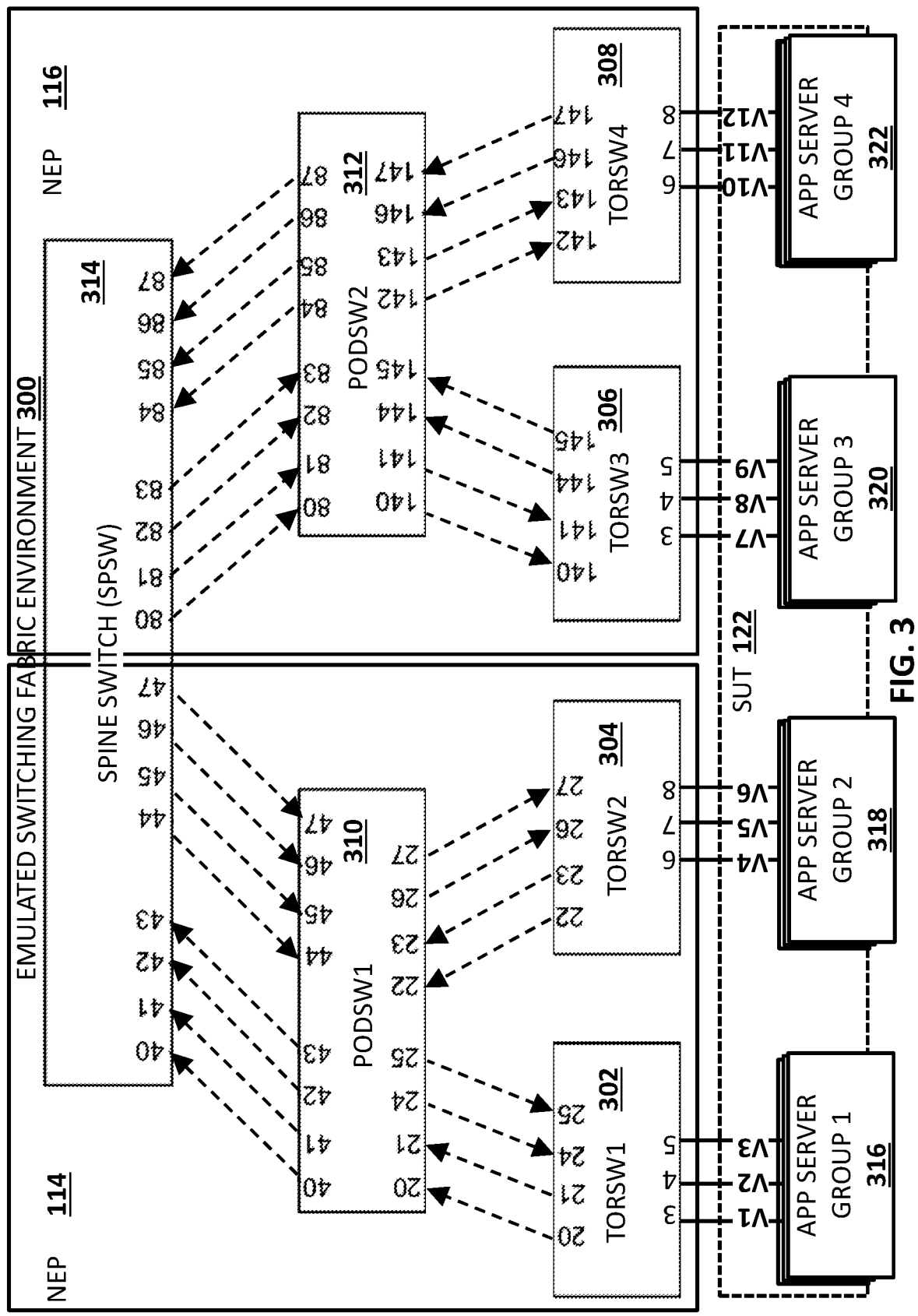
FIG. 3 is a diagram illustrating an example emulated switching fabric environment usable for network testing.

FIG. 3 is a diagram illustrating an example emulated switching fabric environment 300 usable for network testing. Emulated switching fabric environment 300 may represent a switching fabric comprising a network of emulated switches for forwarding packets from or to SUT 122 or other entities, where the emulated switches may be connected via a particular (e.g., user-defined) logical topology. For example, emulated switching fabric environment 300 may be implemented using resources (e.g., switches 208) of NEPs 114 and 116 and configured based on user input and/or predetermined environment templates or data models, e.g., stored in data storage 216.

In some embodiments, e.g., where emulated switching fabric environment 300 uses multiple NEPs (e.g., NEPs 114 and 116), physical connections or links may be used for communicatively connecting NEPs or physical resources therein. For example, each of NEPs 114-118 may use one or more of its physical ports 210 for interconnecting or linking with other NEPs., e.g., via 40G or 100G links. In another example, each of NEPs 114-118 may be communicatively connected via wireless transceivers.

Referring to FIG. 3, emulated switching fabric environment 300 may represent a 3-stage Clos switching network comprising different stages of emulated switches, wherein each emulated switch is implemented using physical resources of NEP 114 and/or 116. As depicted, stage one switches of emulated switching fabric environment 300 include top of rack switches (TORSWs) 302 and 304 implemented using NEP 114 and TORSWs 306 and 308 implemented using NEP 116. Stage two switches of emulated switching fabric environment 300 include cluster or pod switch (PODSW) 310 implemented using NEP 114 and PODSW 312 implemented using NEP 116. Stage three of emulated switching fabric environment 300 include a spine switch (SPSW) 314 implemented using both NEP 114 and 116. In some embodiments, TORSWs 302-308 may represent or emulate switches that are connected to multiple servers (e.g., located within a rack or nearby rack), PODSWs 310-312 may each represent or emulate an aggregation switch that is connected to multiple TORSWs, and SPSW 314 may represent or emulate a higher-level aggregation switch that is connected to multiple PODSWs.

In some embodiments, characteristics (e.g., bandwidth, supported protocols, or processing speed or throughput) of emulated switches may be varied as defined by test configuration information or related settings. For example, each of NEPs 114 and 116 may include a different brand, type, and/or version of switches 208 and/or other hardware. In this example, depending on user input and/or configuration information, NEPRA 110 may indicate which NEP is to emulate which emulated switches based on NEP capabilities and user requirements for emulated switching fabric environment 300.

In some embodiments, some physical ports of switch(es) 208 of NEPs 114 and 116 may be associated with different emulated switches and may utilize loopback interfaces or internal interfaces for emulating communications between some emulated switches, while other emulated switches (e.g., TORSWs 302-308) may utilize physical interfaces and/or physical cabling for communicating with SUT 122 or portions thereof.

In some embodiments, SUT 122 may represent or include a set of application server groups 316-322., each representing one or more servers and/or applications. For example, application server group 1 316 may include multiple servers (e.g., 16 or more servers in a single rack), each having one or more connections to a TOR switch. In some examples, a server of application server groups 316-322 may include multiple applications or perform different services (e.g., machine learning (M/L), storage offload, search engines, webpages, video streaming, email, etc.) for users or may perform similar services for different sets of users. In some examples, a server of application server groups 316-322 may act as a client to another server.

In some embodiments, each of application server groups 316-322 may be connected (e.g., physically cabled) to a different set of physical ports 210 of switch(es) 208 in NEP 114 or NEP 116, where each set of physical ports 210 is assigned or allocated to a particular emulated switch. For example, RA 206 of a respective NEP may assign physical ports '60', '61', and 62' to an emulated switch TORSW1 and may virtualize those physical ports as 'v1', 'v2', and 'v3', respectively. In this example, applications and/or servers in application server group 1 316 may be communicatively coupled to one or more of the logical ports of the emulated switch TORSW1.

In some embodiments, configuration information may include any suitable information for mapping logical ports associated with emulated switching fabric environment 300 to physical ports of switch(es) 208 in one of NEPs 114-118. In some embodiments, configuration information may be stored or maintained in data storage 216 and may be usable for translating port information or related information in switch configuration commands, performance metrics, and/or other communications.

It will be appreciated that FIG. 3 is for illustrative purposes and that various depicted entities, their locations, and/or their functions described above in relation to FIG. 3 may be changed, altered, added, or removed.

Figure 4:
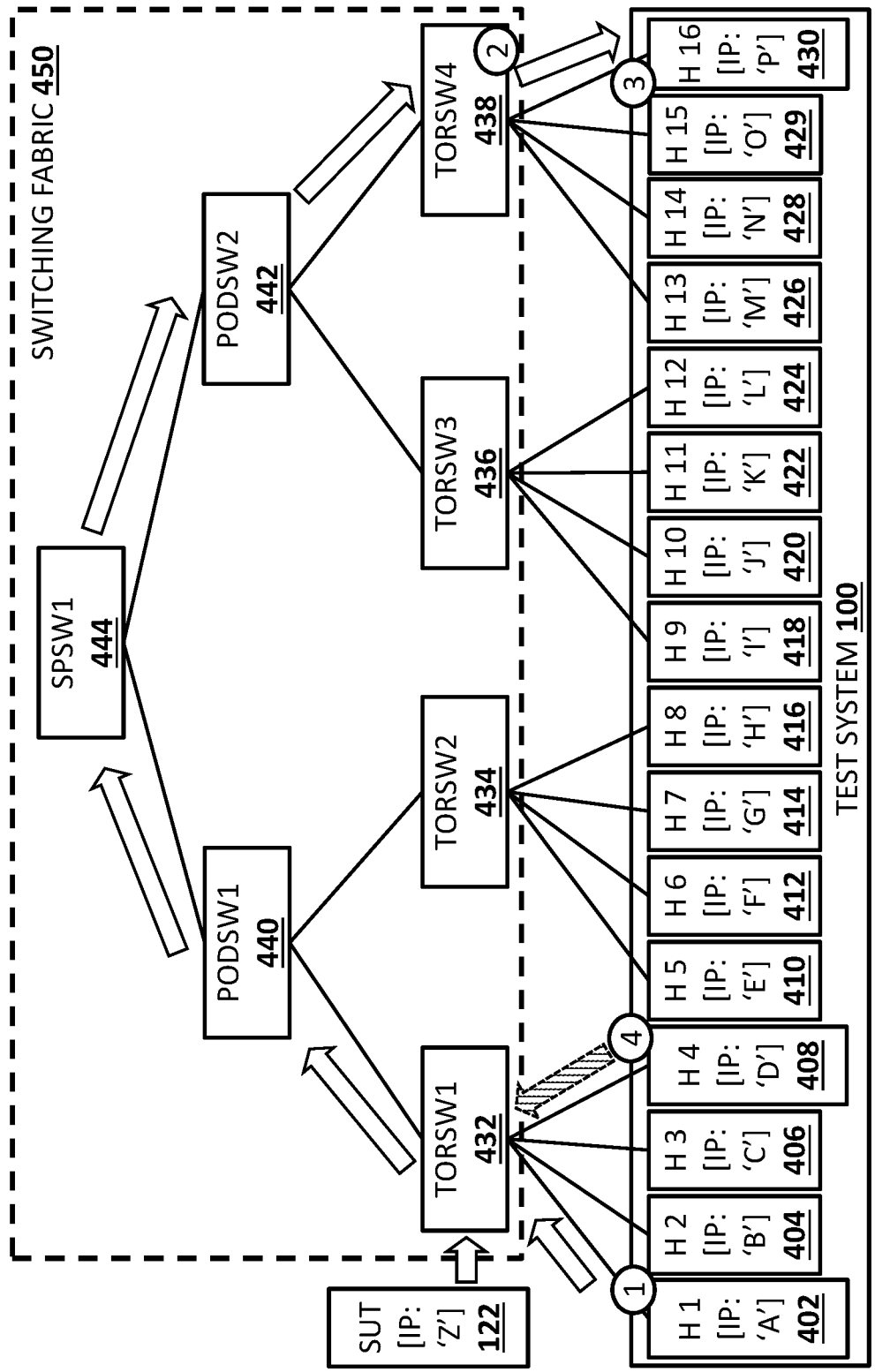
FIG. 4 is a diagram illustrating an example test environment for recycling test packets.

FIG. 4 is a diagram illustrating an example test environment 400 for recycling test packets. Test environment 400 may include or involve test system 100, SUT 122, and switching fabric 450. Test system 100 may include various functionality for testing SUT 122 using switching fabric 450. For example, during testing, test system 100 may generate and send test packets that traverse switching fabric 450 while SUT 122 also sends packets that traverse switching fabric 450.

In some embodiments, test system 100 may be configured to generate test packet traffic (e.g., background packets) for use in testing various user-specified or predefined networking scenarios associated with SUT 122, for injecting test packet traffic into switching fabric 450 such that the test traffic flows through switching fabric 450 and towards a destination that is accessible via switching fabric 450, and to subsequently recycle some or all of the test packet traffic such that a desired level of fabric loading can be obtained and/or maintained, e.g., without requiring test system 100 to constantly generate and inject new test packets.

Switching fabric 450 may represent an emulated fabric switching environment (e.g., emulated fabric switching environment 300) and/or a real or physical switching fabric environment, e.g., a data center based switching fabric. For example, switching fabric 450 may include one or more switches emulated by one or more of NEPs 114-118. In another example, switching fabric 450 may include virtual switches or physical switches (e.g., elements not emulated by NEPs 114-118 or directly controlled by test system 100). In another example, switching fabric 450 may include one or more switches emulated by one or more of NEPs 114-118 and one or more physical switches.

In some embodiments, switching fabric 450 may represent a data center (DC) switching fabric environment. For example, as depicted in FIG. 4, the DC switching fabric emulation may comprise a 3-tiered hierarchy of switches (e.g., a layer 2 and/or 3 router or packet forwarding device) that includes a ToR switching tier (e.g., TORSW1 432, TORSW2 434, TORSW3 436, and TORSW4 438), a pod switching tier (e.g., PODSW1 440 and PODSW2 442) and a spine switching tier (e.g., SPSW1 444). In this example, test system 100 may emulate various network devices or endpoints (e.g., hosts 402-430) including source and destination endpoints associated with test packets.

In some embodiments, e.g., as depicted in FIG. 4, test system 100 may emulate multiple hosts 402-430 usable as endpoints or other devices during a test session. In some embodiments, each host may be assigned an unique or shared network address and/or one or more ports for communications. For example, host 1 402 may be associated with an internet protocol (IP) address 'A' (e.g., 1.1.1.5) and may utilize one or ports for sending or receiving packets and host 16 430 may be associated with an IP address 'P' (e.g., 4.4.4.5) and may utilize one or more ports may utilize one or ports for sending or receiving packets, e.g., a designated fabric recycling port. In this example, if test packets are received on the designated fabric recycling port, then host 16 430 may be configured to forward those packets to host 4 408 for re-sending or recycling through switching fabric 450.

In some embodiments, test system 100 or related entities may include or utilize test packet generation functionality that enables one or more test packets (e.g., background packets) to be created, e.g., according to a user-specified test plan or dynamically based on observable performance metrics. For example, test system 100 may execute a test session that requires the generation of test packets that includes routing label information which makes the test packets appear to have been sourced from host 1 402 (e.g., an emulated endpoint device with a source IP address of 1.1.1.5) and which are destined for host 16 402 (e.g., an emulated endpoint device with a source IP address of 4.4.4.5). In this example, the source and destination endpoints are emulated by test system 100.

Referring to FIG. 4, at step 1, test packets may be injected into switching fabric 450. For example, test packet may be transmitted via a transmit port associated with host 1 402 toward an adjacent ToR switch, TORSW1 432, referred to herein as an ingress switch. In some embodiments, both host 1 402 and TORSW1 432 may be emulated by test system 100 or related entities.

In some embodiments, e.g., as represented by the white arrows in FIG. 4, each injected test packet may traverse a path through switching fabric 450 determined by its routing label and the routing rules (e.g., layer 3 routing rules) provisioned in the switches of switching fabric 450. In this example, such routing rules may be provisioned by test system 100 or CM 108 as part of test case configuration.

At step 2, when a test packet arrives at a last switch, e.g., TORSW4 438, in the fabric traversal path (referred to herein as an egress switch), TORSW4 438 may be configured to apply a routing rule which directs the test packet to a fabric recycling port associated with host 16 430.

In some embodiments, TORSW4 438 and/or other switches in switching fabric 450 may include logic for identifying a test packet to recycle. For example, TORSW4 438 may apply a routing rule which directs all packets with routing label SrcIP: 1.1.1.5, Dest_IP: 4.4.4.5 to the designated fabric recycling port. In another example, test packets that are recyclable may include a "recyclable" identifier (e.g., a special header or payload parameter) and TORSW4 438 may apply a routing rule which directs all packets with "recyclable" identifiers to the designated fabric recycling port.

In some embodiments, hosts 402-430 may include logic for identifying a test packet or a test packet to recycle. For example, in lieu of or in addition to a designated fabric recycling port, host 16 430 may utilize logic for determining whether test packets are to be recycled, e.g., the number of background packets to be recycled may be determined based on current observable performance metrics (e.g., monitored queue depths or monitored traffic rates or loads) and/or based on a test plan. In another example, host 16 430 may include routing rules or related logic which directs all packets with a "recyclable" identifier or having a certain source-destination label to be sent to a re-entry port associated with host 4 408.

At step 3, host 16 430 may receive a test packet and may forward the test packet (e.g., via an internal path or channel) to a designated re-entry port associated with host 4 408. For example, after a test packet is forwarded or sent to a fabric recycling port associated with host 16 430, the test packet may be sent to a special re-entry port associated with host 4 408 which is served by the ingress switch (e.g., TORSW1 432) that originally received the test packet during the initial injection stage.

At step 4, host 4 408 may be configured for forwarding or sending a received test packet (represented as a striped arrow) back to TORSW1 432, which effectively recycles the packet, e.g., the test packet once again traverses switching fabric 450.

In some embodiments, the packet recycling or loopback process described above in regard to FIG. 4 may be repeated as many times as desired during a test, and the number of traversals for any test packet may be user configurable.

In some embodiments, various test environment entities may utilize TTL parameter value modification for facilitating packet recycling. For example, SPSW1 444 may be configured to adjust or ignore TTL parameter values such that the test packets (e.g., background packets) may be recycled indefinitely, for a predetermined number of traversals, for a predetermined amount of time, or for a dynamic period (e.g., determinable, for example, using observed performance metrics associated with switching fabric 450, SUT 122, and/or another test related entity). In this example, TTL parameter value modification may effectively prevent a switch or router within switching fabric 450 from dropping the test packet (e.g., the TTL parameter value in a test packet may be modified and increased). In some embodiments, TTL parameter value modification of the test packet may be performed at any hop configurable by test system 100, e.g., at a switch of switching fabric 450, host 16 430, host 4 408, or another test system entity that provides such TTL parameter value modification functionality.

In some embodiments, TORSW4 438 and/or other switches in switching fabric 450 may include logic for adjusting TTL parameter values associated with test packets that are recycled. For example, prior to sending a test packet to test system 100 or a related host for recycling, TORSW4 438 may reset the TTL parameter value contained in the test packet to a predetermined non-zero value, where the non-zero value is sufficient to allow the test packet to repeat a traversal of switching fabric 450.

In some embodiments, TORSW4 438 and/or other switches in switching fabric 450 may include logic for ignoring TTL parameter values associated with test packets that are recycled. For example, switches 432-444 may be configured to forward a test packet without decrementing the TTL parameter value contained in the test packet, thereby allowing the test packet to be recycled (e.g., re-sent through switching fabric 450) as many times as is desired or required for a given test plan.

It will be appreciated that FIG. 4 is for illustrative purposes and that various depicted entities, their locations, and/or their functions described above in relation to FIG. 4 may be changed, altered, added, or removed. For example, test environment 400 may involve a DC switching fabric component which is emulated by test system 100 or may involve real or physical DC switching fabric elements. It will be appreciated that test environment 400 may also involve both emulated and real or physical data center architectures.

Figure 5:
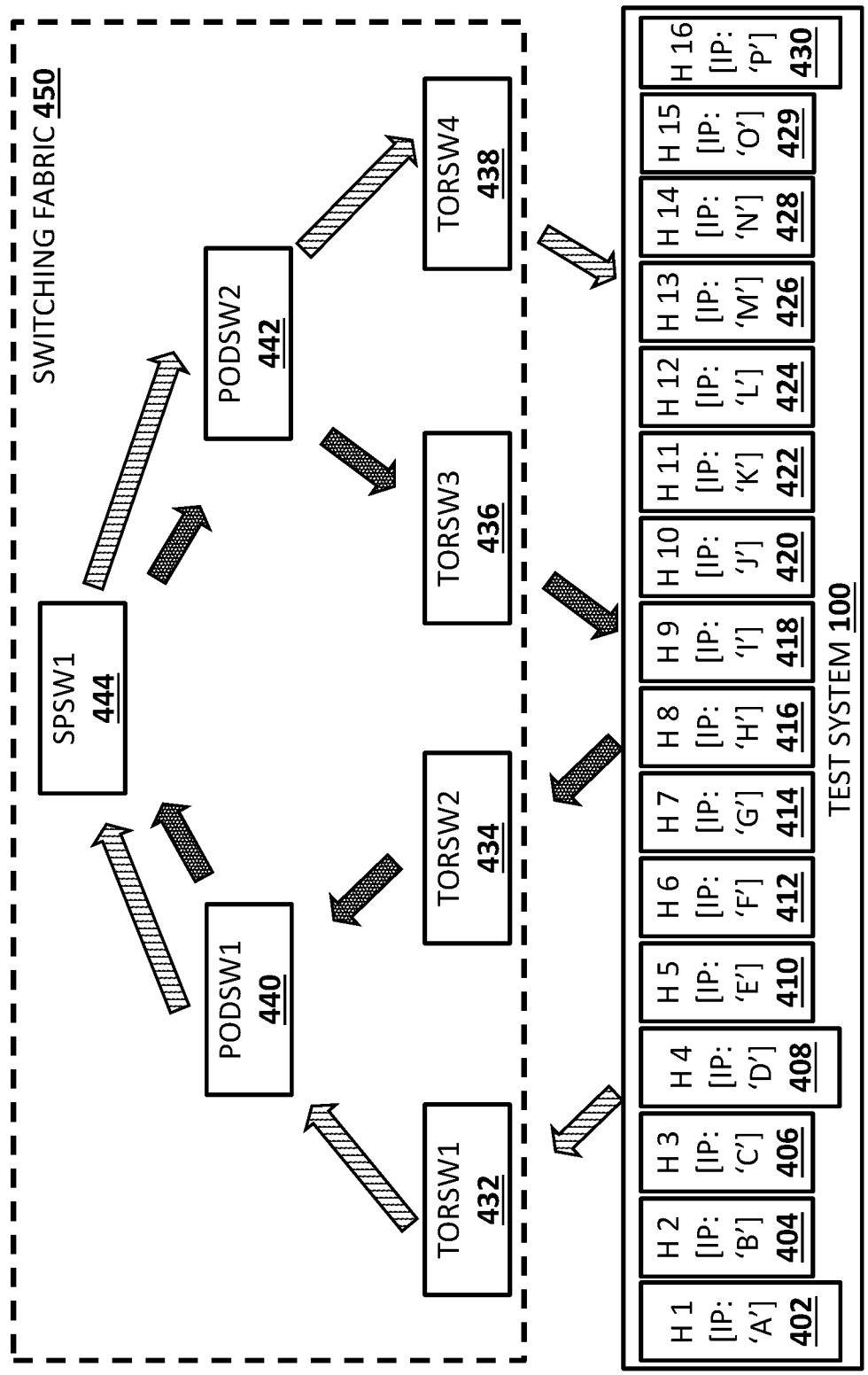
FIG. 5 is a diagram illustrating example multiple packet recycling paths.

FIG. 5 is a diagram illustrating example multiple packet recycling paths. Referring to FIG. 5, test system 100 may be configured for facilitating multiple loopback paths or recycling paths during testing. For example, test system 100 or a related entity (e.g., CM 108) may generate and provide configuration information (e.g., routing rules) to switching fabric elements (e.g., switches 432-444) for a particular test session. In this example, the configuration information may cause some packet flows to be directed along a different traversal path than other packet flows during the test session. Continuing with this example, the configuration information may cause some flows or packets thereof to be recycled or resent along a same path or a different traversal path (or portion thereof) than it originally traveled.

As illustrated in FIG. 5, a pair of test flows generated by test system 100 and injected into switching fabric 450 may be recycled, where each flow uses different recycling paths during a test session. For example, switching fabric elements (e.g., TORSW1 432, PODSW1 440, SPSW1 444, PODSW2 442, and TORSW4 438) may be configured with routing rules that direct packets of a first test flow (represented as striped arrows) to traverse switching fabric 450 and ultimately be directed to a first fabric recycling port associated with host 13 426. Once received at the first fabric recycling port, the first test flow may be looped back to a first re-entry port associated with host 4 408. In this example, switching fabric elements (e.g., TORSW2 432, PODSW1 440, SPSW1 444, PODSW2 442, and TORSW3 436) may be concurrently configured with routing rules that direct packets of a second test flow (represented as dark arrows) to traverse a different or smaller portion of switching fabric 450 and ultimately be directed to a second fabric recycling port associated with associated with host 9 418. Once received at the second fabric recycling port, the second test flow may be looped back to a second re-entry port associated with associated with host 8 416. It will be appreciated that the number of concurrent loopback paths associated with a test case is user-configurable.

It will be appreciated that FIG. 5 is for illustrative purposes and that various depicted entities, their locations, and/or their functions described above in relation to FIG. 5 may be changed, altered, added, or removed. It will also be appreciated the number of concurrent loopback paths associated with a test case is user-configurable and that the number of concurrent loopback paths as well as the topology of these paths may be dynamically adjusted (e.g., by test system 100) during execution of a test case. Further, it will be appreciated that such dynamic changes can be made according to a predetermined test plan or in response to an observed performance of switching fabric 450 and/or SUT 122 during test session.

Figure 6:
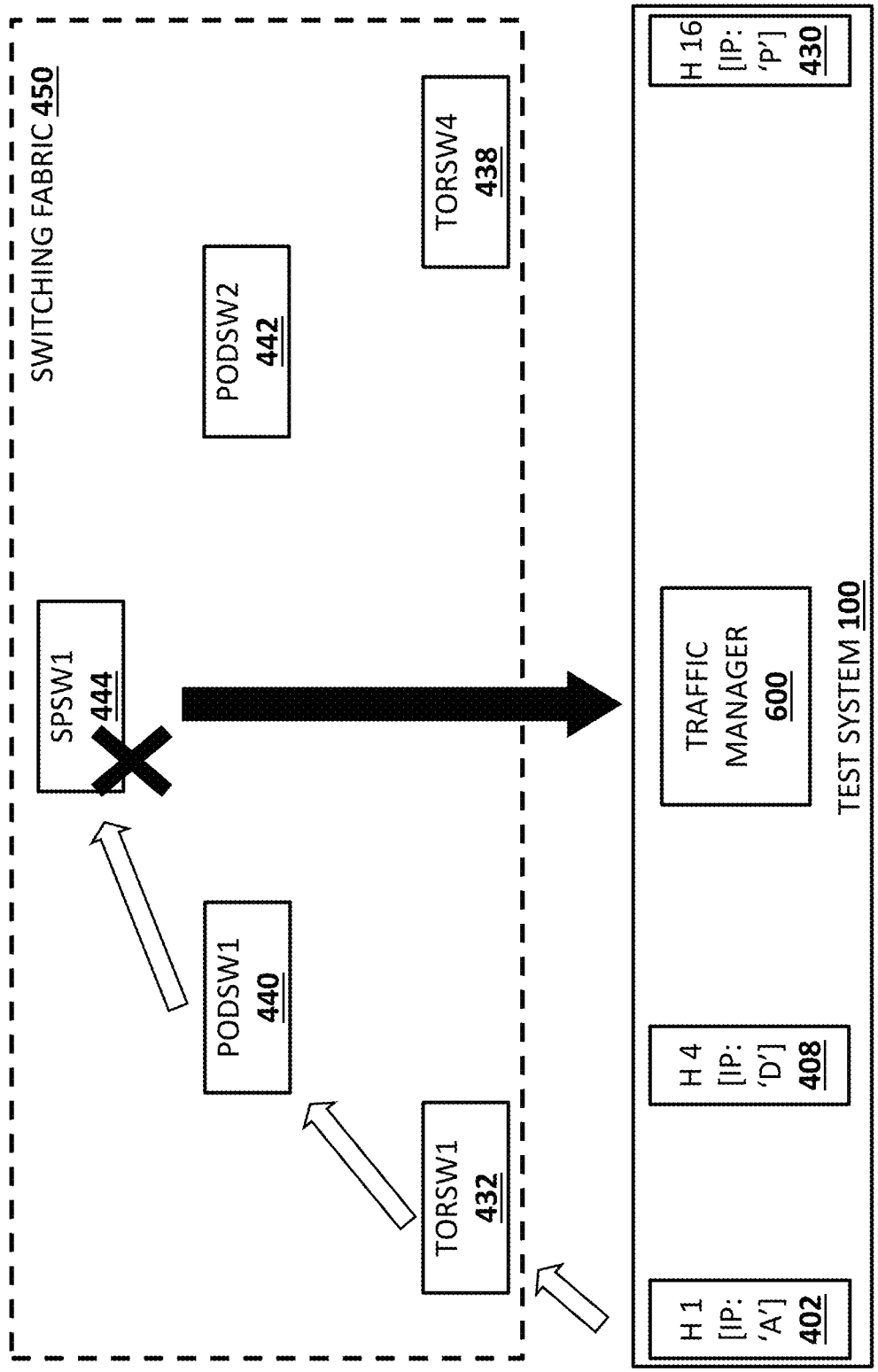
FIG. 6 is a diagram illustrating example traffic management.

FIG. 6 is a diagram illustrating example traffic management. Referring to FIG. 6, test system 100 may be configured for executing test sessions that involve generating various types of test traffic, including background packets, in a test environment. For example, a test environment may include test system 100, SUT 122, and switching fabric 450. In this example, test system 100 may configure one or more test related entities to monitor and control the amount of test packets (e.g., background packets) being generated and/or actively traversing the test environment during testing.

In some embodiments, test system 100 may include a traffic manager 600 for managing background traffic and/or other traffic during execution of a test or test session. Traffic manager 600 may represent any suitable entity or entities (e.g., software executing on a processor, an FPGA, and/or an ASIC, or a combination of software, an FPGA, and/or an ASIC) for performing one or more aspects associated with managing (e.g., generating, inserting, dropping, or recycling) packets during a test session. In some embodiments, traffic manager 600 may be configured for maintaining or adjusting traffic pressure (e.g., traffic load) on switching fabric 450 or a related path, for controlling packet re-injection (e.g., recycling) behaviors, adding traffic delays, performing or adjusting traffic shaping, performing adaptive traffic generation (e.g., to control number of packets traversing switching fabric 450).

In some embodiments, traffic manager 600 may instruct various switching fabric elements (e.g., switches 432-444) to monitor packet drops or other performance metrics. In this example, traffic manager 600 or a related entity (e.g., switches 432-444) may adjust the amount of background packets traversing switching fabric 450 based on one or more factors, e.g., test requirements, observed behaviors, and/or related performance metrics.

In some embodiments, traffic manager 600 or another entity (e.g., CM 108) may configure switching fabric 450 or entities therein to identify test packets (e.g., background packets) that are dropped while traversing switching fabric 450 and to automatically forward these test packets to test system 100 or a related entity, e.g., a fabric recycling port associated with host 4 408. For example, after receiving forwarded test packets that were dropped, test system 100 or a related entity (e.g., host 4 408) may be configured to re-send these test packets or a portion thereof back to switching fabric 450 or a switch therein (e.g., TORSW1 432).

In some embodiments, traffic manager 600 or another entity may be configured for facilitating acceptable traffic volumes or rates (e.g., in switching fabric 450 or a related switch) during testing. For example, test packets may drop during traversal of switching fabric 450 due to queue congestion at a switch along the transit path). In this example, test system 100 or related entities may be configured such that only the volume of test packets that successfully traverse switching fabric 450 on a given transit or pass-through will be recycled and allowed to make a subsequent traversal of switching fabric 450.

In some embodiments, test system 100 or a related entity (e.g., traffic manager 600) may be configured for adaptive (e.g., ramping up) test traffic generation. For example, test system 100 or a related entity (e.g., traffic manager 600) may be configured for monitoring switching fabric 450 and for detecting dropped test packets. During an adaptive test traffic generation operation mode, if no test packets are dropped, test system 100 or a related entity (e.g., traffic manager 600 or host 1 402) may be configured to automatically generate and inject additional test packets (e.g., background packets) into switching fabric 450. If a test packet drop is detected during a subsequent monitoring interval, test system 100 or a related entity (e.g., traffic manager 600 or host 1 402) may be configured to halt or pause the generation and injection of additional test packets.

In some embodiments, an adaptive test traffic generation operation mode can facilitate controlling, adjusting, or maintaining depths of various fabric switch queues. For example, by utilizing an adaptive test traffic generation operation mode, test system 100 or a related entity (e.g., traffic manager 600) may automatically maintain one or more fabric switch queues at an arbitrary or predetermined depth during test execution, e.g., pursuant to a test plan or a test operator's preferences.

It will be appreciated that FIG. 6 is for illustrative purposes and that various depicted entities, their locations, and/or their functions described above in relation to FIG. 6 may be changed, altered, added, or removed. For example, traffic manager 600 or similar functionality may be incorporated or performed by various test system entities, e.g., CTC 102 or CM 108.

Figure 7:
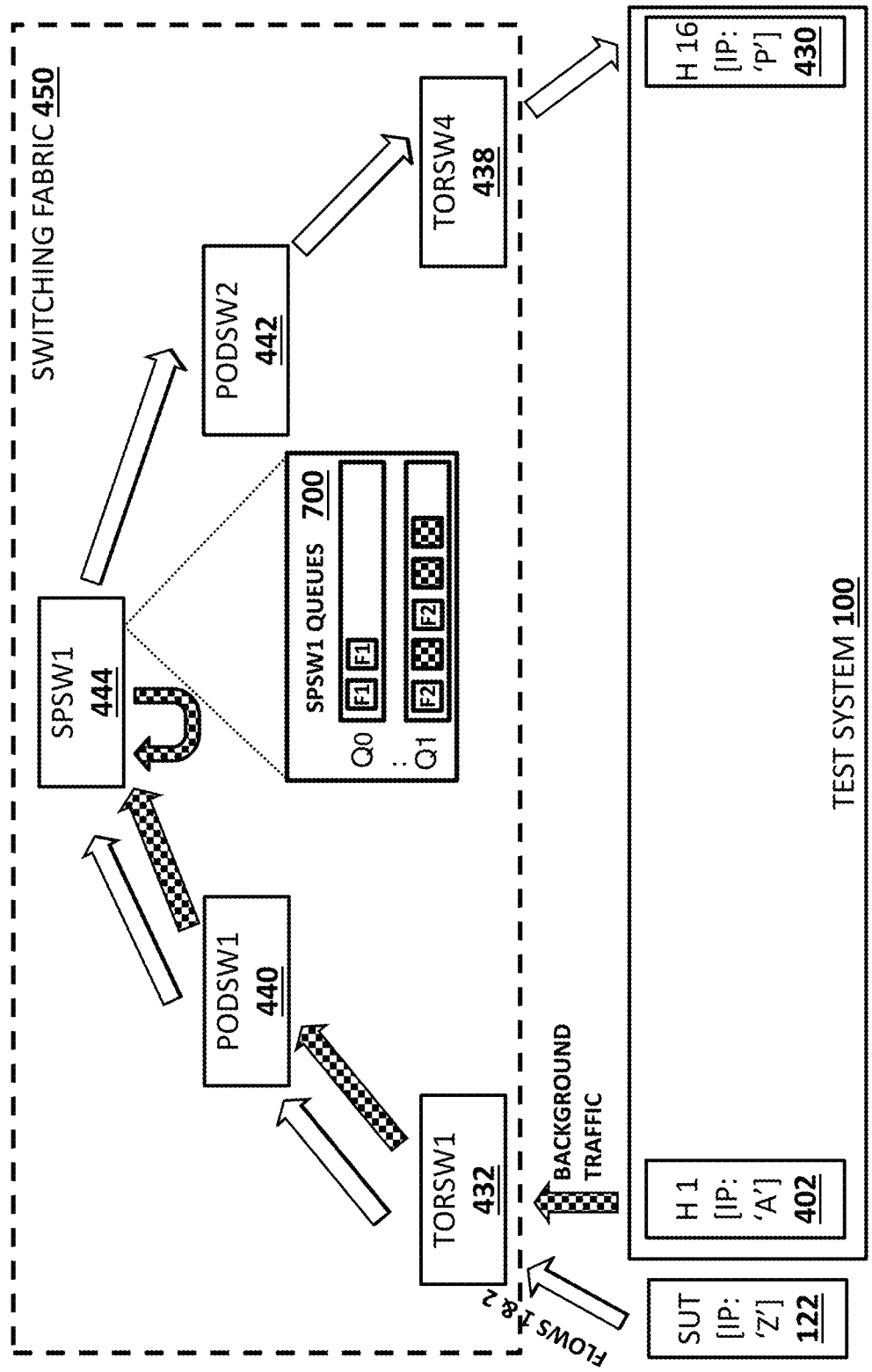
FIG. 7 is a diagram illustrating example intra-switch packet recycling.

FIG. 7 is a diagram illustrating example intra-switch packet recycling. In some embodiments, switching fabric 450 or entities therein (e.g., switches 432-444) may be configured (e.g., using configuration information and/or routing rules) to control or adjust the paths of test packets, e.g., background packets. For example, switching fabric 450 or entities therein may be configured to use loopback paths such that background packets continue to loop at a given switch. In this example, these background packets may not follow the same path through switching fabric 450 as other test packets or a user flow (e.g., a flow of packets generated by a SUT 122).

In some embodiments, test system 100 may be configured to test SUT 122 by monitoring DUT performance when user traffic traverses switching fabric 450. In some embodiments, user flows (e.g., flows 1 and 2) originating from SUT 122 may be sent via switching fabric 450. In such embodiments, one or more test sessions may involve test system 100 or host 1 402 generating and sending test packets into switching fabric 450 while the user flows are also traversing switching fabric 450.

In some embodiments, one or more switching fabric elements may receive routing rules for recycling background traffic so as to maintain or increase packet queues or buffers or for other purposes. For example, as depicted in FIG. 7, test traffic (e.g., background packets) may be injected (e.g., by host 1 402) into switching fabric 450 and the test traffic may traverse switching fabric 450 using a same path as flows 1 and 2 until SPSW1 444. In this example, at SPSW1 444, routing rules may be applied which result in looping of at least some of the test traffic at SPSW1 444, e.g., from a designated recycling egress port on SPSW1 444 to a designated re-entry ingress port on SPSW1 444.

In some embodiments, intra-switch packet recycling by SPSW1 444 or another switching fabric element may utilize TTL parameter value manipulation. For example, SPSW1 444 may be configured to adjust or ignore TTL parameter values such that the test packets (e.g., background packets) may be looped back indefinitely, for a predetermined number of traversals or loops, for a predetermined amount of time, or for a dynamic period (e.g., determinable, for example, using observed performance metrics associated with switching fabric 450, SUT 122, and/or another test related entity).

In some embodiments, intra-switch packet recycling or related loopbacks may be utilized for loading particular buffers and queues in a switching fabric element and/or for introducing localized latency for a particular flow. For example, as depicted in FIG. 7, SPSW1 444 may utilize packet queues 700, e.g., queue Q0 and queue Q1. In this example, packets from flow 1 (F1) may be stored in queue Q0 and packets from flow 2 (F2) may be stored in queue Q1. Continuing with this example, prior to testing, test system 100 or a related entity may send routing rules or related configuration information to SPSW1 444 such that SPSW1 444 can introduce latency when processing F2 packets by sending or looping test packets back to itself such that the test packets are inserted in queue Q1, thereby causing queue Q1 to have or maintain a higher queue depth than queue Q0 and, hence, increasing latency for queued F2 packets.

In some embodiments, switching fabric 450 or entities therein (e.g., switches 432-444) may be configured such that recycled test packets can be localized on a particular link, switch, or queue. For example, after looping test packets at SPSW1 444, SPSW1 444 may determine that these packets are no longer needed and may discard or otherwise prevent sending these packets onward (e.g., to PODSW2 442 or an original intended destination). Hence, in this example, SPSW1 444 may prevent pressure or congestion associated with these recycled packets from propagating further in switching fabric 450.

It will be appreciated that FIG. 7 is for illustrative purposes and that various depicted entities, their locations, and/or their functions described above in relation to FIG. 7 may be changed, altered, added, or removed.

Figure 8:
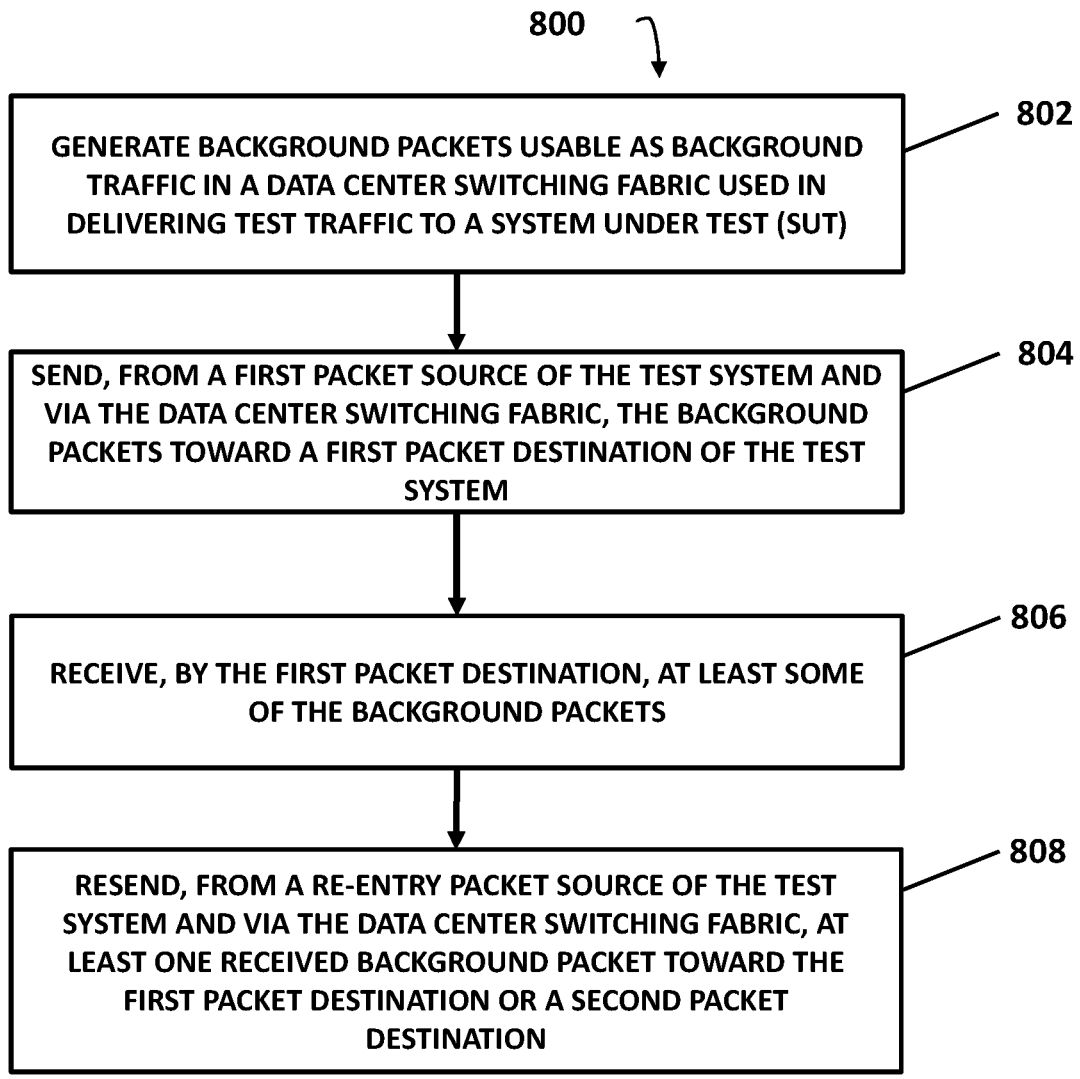
FIG. 8 is a diagram illustrating an example process for recycling background traffic in a test environment.

FIG. 8 is a diagram illustrating an example process 800 for recycling background traffic in a test environment. In some embodiments, process 800, or portions thereof, may be performed by or at test system 100, test system 100, CTC 102, CM 108, NEPRA 110, one or more of NEPs 114-118, testing applications 214, traffic manager 600, and/or another node or module. In some embodiments, process 800 may include steps 802-806.

Referring to process 800, in step 802, background packets may be generated, where the background packets are usable as background traffic in a DC switching fabric (e.g., a fabric comprising emulated and/or real switches, e.g., in a data center switching fabric architecture) used in delivering test traffic to a SUT. For example, test system 100 or a related entity may generate background packets for traversing switching fabric 450 during a test session.

In step 804, the background packets may be sent, from a first packet source (e.g., an emulated endpoint or a transmit port associated with an emulated endpoint) of the test system and via the DC switching fabric, toward a first packet destination of the test system. For example, host 1 402 may inject background traffic into switching fabric 450 via one or more physical or virtual ports of switching fabric 450. In this example, the background packets may be addressed to a packet destination associated with test system 100, e.g., a fabric recycling port associated with host 16 430.

In step 806, at least some of the background packets may be received by the first packet destination. For example, host 16 430 may receive background packets via one or more physical or virtual ports of switching fabric 450. In this example, test system 100 or a related entity (e.g., host 16 430) may use configuration information (e.g., recycling rules) and packet identifying information to determine which background packets are to be recycled (e.g., resent into switching fabric 450). Continuing with this example, the configuration information may indicate that packets sent to or received on a particular port (e.g., a fabric recycling port) are to be recycled.

In step 808, at least one received background packet may be resent, from a re-entry packet source of the test system and via the DC switching fabric, toward the first packet destination or a second packet destination. For example, after host 16 430 receives a background packet on a designated recycling port and/or determines to recycle that background packet, the background packet may be forwarded to a re-entry port of host 4 408 (e.g., an emulated host with a unique IP address) and host 4 408 may then send or forward the background packet toward host 16 430 or a different destination, e.g., host 9 418.

In some embodiments, the DC switching fabric may be emulated by the test system. For example, test system 100 or one or more of NEPs 114-118 may implement emulated switching fabric environment 300 or may emulate multiple switching fabric elements (e.g., TORSW2 432, PODSW1 440, SPSW1 444, PODSW2 442, and/or TORSW3 436).

In some embodiments, the first packet source, the first packet destination, and the re-entry packet source may be hosts with unique network addresses emulated by the test system.

In some embodiments, the test system, the DC switching fabric, or a related device may modify TTL parameter values in the background packets to allow resending.

In some embodiments, the test system, the DC switching fabric, or a related device may avoid or skip TTL parameter values in the background packets to allow resending.

In some embodiments, one or more of the background packets dropped during traversal of the DC switching fabric may be detected by the test system and automatically forwarded to the re-entry packet source of the test system for resending.

In some embodiments, each of the background packets may include an identifier, packet characteristics, or routing label information usable for identifying whether the respective background packet is to be resent through the DC switching fabric.

In some embodiments, the test system or the DC switching fabric uses the identifier, the packet characteristics, or the routing label information to determine the at least one received background packet for resending.

In some embodiments, the test system dynamically injects new background packets into the DC switching fabric or drops existing background packets in the DC switching fabric in response to observed changes in a performance metric associated with the DC switching fabric or the SUT.

In some embodiments, the DC switching fabric or a related entity uses a loopback path to re-insert some of the background packets in a packet queue. For example, SPSW1 444 may be configured to maintain a particular amount of packets in its egress packet queues. In this example, SPSW1 444 may use a loopback path to keep resending one or more background packets back to itself in effort to maintain queue depths, increase latency, or for other purposes.

It will be appreciated that process 800 is for illustrative purposes and that different and/or additional actions may be used. It will also be appreciated that various actions described herein may occur in a different order or sequence.

It should be noted that test system 100, CTC 102, CM 108, NEPRA 110, NEPs 114-118, and/or functionality described herein may constitute one or more special purpose computing devices. Further, test system 100, CTC 102, CM 108, NEPRA 110, NEPs 114-118, and/or functionality described herein can improve the technological field of testing networks and related nodes by providing mechanisms and techniques for recycling background traffic in a test environment.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for recycling background traffic in a test environment, the method comprising:
    at a test system implemented using at least one processor:
        generating background packets usable as background traffic in a data center switching fabric used in delivering test traffic to a system under test (SUT);
        sending, from a first packet source of the test system and via the data center switching fabric, the background packets toward a first packet destination of the test system, the first packet destination emulating a first endpoint device;
        receiving, by the first packet destination, at least some of the background packets; and
        resending, from a re-entry packet source of the test system and via the data center switching fabric, at least one received background packet toward the first packet destination or a second packet destination, the second packet destination emulating a second endpoint device.

2. The method of claim 1 wherein the data center switching fabric is emulated by the test system and the first packet source, the first packet destination, and the re-entry packet source are hosts with unique network addresses emulated by the test system.

3. The method of claim 1 wherein the test system, the data center switching fabric, or a related device modifies time to live (TTL) parameter values in the background packets to allow resending.

4. The method of claim 1 wherein the test system, the data center switching fabric, or a related device avoids decrementing time to live (TTL) parameter values in the background packets to allow resending.

5. The method of claim 1 wherein one or more of the background packets dropped during traversal of the data center switching fabric are detected by the test system and automatically forwarded to the re-entry packet source of the test system for resending.

6. The method of claim 1 wherein each of the background packets includes an identifier, packet characteristics, or routing label information usable for identifying whether the respective background packet is to be resent through the data center switching fabric.

7. The method of claim 6 wherein the test system or the data center switching fabric uses the identifier, the packet characteristics, or the routing label information to determine the at least one received background packet for resending.

8. The method of claim 1 wherein the test system dynamically injects new background packets into the data center switching fabric or drops existing background packets in the data center switching fabric in response to observed changes in a performance metric associated with the data center switching fabric or the SUT.

9. The method of claim 1 wherein the data center switching fabric or a related entity uses a loopback path to re-insert at least one of the background packets in a packet queue.

10. A system for recycling background traffic in a test environment, the system comprising:
a test system comprising:
at least one processor; and
a memory,
wherein the test system is configured for:
generating background packets usable as background traffic in a data center switching fabric used in delivering test traffic to a system under test (SUT);
sending, from a first packet source of the test system and via the data center switching fabric, the background packets toward a first packet destination of the test system, the first packet destination emulating a first endpoint device;
receiving, by the first packet destination, at least some of the background packets; and
resending, from a re-entry packet source of the test system and via the data center switching fabric, at least one received background packet toward the first packet destination or a second packet destination, the second packet destination emulating a second endpoint device.

11. The system of claim 10 wherein the data center switching fabric is emulated by the test system and the first packet source, the first packet destination, and the re-entry packet source are hosts with unique network addresses emulated by the test system.

12. The system of claim 10 wherein the test system, the data center switching fabric, or a related device modifies time to live (TTL) parameter values in the background packets to allow resending.

13. The system of claim 10 wherein the test system, the data center switching fabric, or a related device avoids decrementing time to live (TTL) parameter values in the background packets to allow resending.

14. The system of claim 10 wherein the test system detects background packets dropped during traversal of the data center switching fabric and automatically forwards the dropped background packets to the re-entry packet source of the test system for resending.

15. The system of claim 10 wherein each of the background packets includes an identifier, packet characteristics, or routing label information usable for identifying whether the respective background packet is to be resent through the data center switching fabric.

16. The system of claim 15 wherein the test system or the data center switching fabric uses the identifier, the packet characteristics, or the routing label information to determine the at least one received background packet for resending.

17. The system of claim 10 wherein the test system dynamically injects new background packets into the data center switching fabric or drops existing background packets in the data center switching fabric in response to observed changes in a performance metric associated with the data center switching fabric or the SUT.

18. The system of claim 10 wherein the data center switching fabric or a related entity uses a loopback path to re-insert at least one of the background packets in a packet queue.

19. The system of claim 18 wherein the at least one of the background packets that are sent to the data center switching fabric via the loopback path is never sent to the first packet destination or the second packet destination.

20. A non-transitory computer readable medium having stored thereon executable instructions embodied in the non-transitory computer readable medium that when executed by at least one processor of an test system cause the test system to perform steps comprising:
generating background packets usable as background traffic in a data center switching fabric used in delivering test traffic to a system under test (SUT);
sending, from a first packet source of the test system and via the data center switching fabric, the background packets toward a first packet destination of the test system, the first packet destination emulating a first endpoint device;
receiving, by the first packet destination, at least some of the background packets; and
resending, from a re-entry packet source of the test system and via the data center switching fabric, at least one received background packet toward the first packet destination or a second packet destination, the second packet destination emulating a second endpoint device.

* * * * *